(12) United States Patent
Bachmutsky et al.

(10) Patent No.: US 11,736,942 B2
(45) Date of Patent: *Aug. 22, 2023

(54) MULTI-DOMAIN TRUST ESTABLISHMENT IN EDGE CLOUD ARCHITECTURES

(71) Applicant: Intel Corporation, Santa Clara, CA (US)

(72) Inventors: Alexander Bachmutsky, Sunnyvale, CA (US); Dario Sabella, Munich (DE); Francesc Guim Bernat, Barcelona (ES); John J. Browne, Limerick (IE); Kapil Sood, Portland, OR (US); Kshitij Arun Doshi, Tempe, AZ (US); Mats Gustav Agerstam, Portland, OR (US); Ned M. Smith, Beaverton, OR (US); Rajesh Poornachandran, Portland, OR (US); Tarun Viswanathan, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/076,452

(22) Filed: Oct. 21, 2020

(65) Prior Publication Data

US 2021/0153019 A1 May 20, 2021

Related U.S. Application Data

(63) Continuation of application No. 16/235,420, filed on Dec. 28, 2018, now Pat. No. 10,848,974.

(51) Int. Cl.
H04W 12/08 (2021.01)
H04W 76/10 (2018.01)
(Continued)

(52) U.S. Cl.
CPC ........ H04W 12/08 (2013.01); G06F 9/45558 (2013.01); H04L 67/10 (2013.01);
(Continued)

(58) Field of Classification Search
CPC ....... H04W 48/08; H04W 4/90; H04W 76/50; H04W 36/0016; H04W 36/0022;
(Continued)

(56) References Cited

U.S. PATENT DOCUMENTS 8,239,572 B1 8/2012 Brandwine et al.
8,434,129 B2 4/2013 Kannappan et al.
(Continued)

OTHER PUBLICATIONS

"U.S. Appl. No. 16/235,420, Advisory Action dated May 18, 2020", 3 pgs.

(Continued)

Primary Examiner — Joseph Arevalo
(74) Attorney, Agent, or Firm — Schwegman Lundberg & Woessner, P.A.

(57) ABSTRACT

A service coordinating entity device includes communications circuitry to communicate with a first access network, processing circuitry, and a memory device. The processing circuitry is to perform operations to, in response to a request for establishing a connection with a user equipment (UE) in a second access network, retrieve a first Trusted Level Agreement (TLA) including trust attributes associated with the first access network. One or more exchanges of the trust attributes of the first TLA and trust attributes of a second TLA associated with the second access network are performed using a computing service executing on the service coordinating entity. A common TLA with trust attributes associated with communications between the first and second access networks is generated based on the exchanges. Data traffic is routed from the first access network to the UE (Continued)

in the second access network based on the trust attributes of the common TLA.

19 Claims, 21 Drawing Sheets

(51) Int. Cl.
| | |
|---|---|
| *H04W 28/02* | (2009.01) |
| *G06F 9/455* | (2018.01) |
| *H04W 4/46* | (2018.01) |
| *H04L 67/10* | (2022.01) |
| *H04W 12/42* | (2021.01) |
| *H04W 12/60* | (2021.01) |
| *H04W 12/06* | (2021.01) |
| *H04W 84/12* | (2009.01) |

(52) U.S. Cl.
CPC ........... *H04W 4/46* (2018.02); *H04W 12/068* (2021.01); *H04W 12/42* (2021.01); *H04W 12/66* (2021.01); *H04W 28/02* (2013.01); *H04W 76/10* (2018.02); *H04W 84/12* (2013.01)

(58) Field of Classification Search
CPC ..... H04W 36/12; H04W 36/14; H04W 36/26; H04W 36/30; H04W 48/06; H04W 4/02; H04W 4/029; H04W 60/00; H04W 60/005; H04W 60/06; H04W 76/22; H04W 88/182; H04W 8/06
USPC ... 455/404.1, 404.2, 436, 432.1, 423, 456.5, 455/432, 418, 407, 405, 414.1, 433, 455/435.1, 560, 406, 566, 460
See application file for complete search history.

(56) References Cited

U.S. PATENT DOCUMENTS

| | | | |
|---|---|---|---|
| 9,183,028 B1 | 11/2015 | Brandwine et al. | |
| 10,250,498 B1 | 4/2019 | Bales et al. | |
| 10,848,974 B2 | 11/2020 | Bachmutsky et al. | |
| 2005/0074015 A1* | 4/2005 | Chari | H04L 12/2856 370/400 |
| 2006/0123234 A1 | 6/2006 | Schmidt et al. | |
| 2006/0123472 A1 | 6/2006 | Schmidt et al. | |
| 2006/0133341 A1* | 6/2006 | Chari | H04L 45/04 370/389 |
| 2008/0144587 A1* | 6/2008 | Gupta | H04W 40/248 370/338 |
| 2009/0296700 A1 | 12/2009 | Stevens et al. | |
| 2010/0190470 A1* | 7/2010 | Raleigh | H04L 63/0428 455/406 |
| 2014/0164776 A1 | 6/2014 | Hook et al. | |
| 2014/0204760 A1 | 7/2014 | Durrani et al. | |
| 2015/0135277 A1* | 5/2015 | Vij | H04L 63/0892 726/4 |
| 2015/0237041 A1 | 8/2015 | Flamini et al. | |
| 2016/0014023 A1 | 1/2016 | He et al. | |
| 2016/0142447 A1* | 5/2016 | Mufti | H04L 65/1093 370/260 |
| 2017/0091785 A1 | 3/2017 | Arangali et al. | |
| 2017/0214694 A1 | 7/2017 | Yan | |
| 2018/0263039 A1* | 9/2018 | Fang | H04W 72/0493 |
| 2019/0044949 A1 | 2/2019 | Bartfai-Walcott et al. | |
| 2019/0069194 A1* | 2/2019 | Jun | H04W 28/10 |
| 2019/0089780 A1 | 3/2019 | Yousaf et al. | |
| 2019/0104030 A1 | 4/2019 | Giust et al. | |
| 2019/0141142 A1 | 5/2019 | Filippou et al. | |
| 2019/0141536 A1 | 5/2019 | Bachmutsky et al. | |
| 2019/0149365 A1 | 5/2019 | Chatterjee et al. | |
| 2019/0243620 A1 | 8/2019 | Sun et al. | |
| 2019/0313318 A1* | 10/2019 | Pawar | H04L 12/14 |
| 2020/0326989 A1* | 10/2020 | Li | G06F 9/45558 |
| 2021/0076236 A1* | 3/2021 | Kimura | H04W 24/08 |
| 2021/0385625 A1* | 12/2021 | Qiao | H04W 4/029 |

OTHER PUBLICATIONS

"U.S. Appl. No. 16/235,420, Examiner Interview Summary dated May 7, 2020", 3 pgs.
"U.S. Appl. No. 16/235,420, Final Office Action dated Mar. 11, 2020", 21 pgs.
"U.S. Appl. No. 16/235,420, Non Final Office Action dated Aug. 14, 2019", 21 pgs.
"U.S. Appl. No. 16/235,420, Notice of Allowance dated Jul. 15, 2020", 8 pgs.
"U.S. Appl. No. 16/235,420, Response filed May 8, 2020 to Final Office Action dated Mar. 11, 2020", 13 pgs.
"U.S. Appl. No. 16/235,420, Response filed Nov. 14, 2019 to Non Final Office Action dated Aug. 14, 2019", 14 pgs.
"GitHub—Cloud-Security-Research", GitHub, Inc., [Online]. Retrieved from the Internet: <URL: https://github.com/cloud-security-research/sgx-ra-tls>, (Accessed Nov. 21, 2019), 6 pgs.
"Istio Security", Istio Authors, [Online]. Retrieved from the Internet: <URL: https://istio.io/docs/concepts/security/>, (Accessed Nov. 21, 2019), 25 pgs.
"Mobile edge computing", Wikipedia, [Online]. Retrieved from the Internet: <URL: https://en.wikipedia.org/wiki/Mobile_edge_computing>, (Accessed Nov. 21, 2019), 4 pgs.
"Operating Level Agreement (OLA) Template", Rev. Mar. 22, 2007, UC Santa Cruz, Information Technology Services, (2007), 8 pgs.
"Operational-Level Agreement", Wkipedia, [Online]. Retrieved from the Internet: <URL: https://en.wikipedia.org/wiki/Operational-level_agreement>, (Accessed Nov. 21, 2019), 2 pgs.
Abadi, Martin, et al., "A Calculus for Access Control in Distributed Systems", ACM Transactions on Programming Languages and Systems, vol. 15, No. 4, [Online]. Retrieved from the Internet: <URL: https://www.researchgate.net/publication/254829858>, (Sep. 1993), 706-734.
Selander, Goeran, et al., "Object Secutiry for Constrained RESTful Environments (OSCORE) draft-ietf-core-object-security-16", IETF Trust and the persons identified as the document authors, [Online]. Retrieved from the Internet: <URL: https://datatracker.ietf.org/doc/html/draft-ietf-core-object-security>, (Mar. 2019), 90 pgs.
Yuan, Jie, et al., "A Reliable and Lightweight Trust Computing Mechanism for IoT Edge Devices Based on Multi-Source Feedback Information Fusion", IEEE Access, vol. 6, [Online]. Retrieved from the Internet: <URL: https://ieeexplore.ieee.org/stamp/stamp.jsp?arnumber=8352868>, (2018), 23626-23638.

\* cited by examiner

MULTI-DOMAIN TRUST ESTABLISHMENT IN EDGE CLOUD ARCHITECTURES

This application is a continuation of U.S. patent application Ser. No. 16/235,420, filed Dec. 28, 2018, which is incorporated herein by reference in its entirety.

TECHNICAL FIELD

Embodiments described herein generally relate to multi-access edge computing (MEC) and related wireless communication systems. More specifically, aspects of the disclosure relate to multi-domain trust establishment in edge cloud architectures such as MEC-based architectures.

BACKGROUND

MEC encompasses architectures that enable cloud computing functionality or information technology (IT) services at network (e.g., cellular network) edges. MEC may reduce network congestion by moving applications, data, discovery, etc. closer to the user (e.g., mobile device, user equipment (UE), station (STA), etc.). Some MEC details dealing with security (e.g., both user security as well as application integrity), radio use, etc., have been promulgated by European Telecommunications Standards Institute (ETSI), such as described in the "Mobile Edge Computing Introductory Technical White Paper," published Sep. 1, 2014. A set of specifications and white papers providing further details and implementation use cases for MEC scenarios is being developed and published on an ongoing basis by ETSI as part of the ETSI MEC industry specification group (ISG).

MEC is intended to support developing mobile use cases of edge computing, to allow application developers and content providers to access computing capabilities and an IT service environment in dynamic settings at the edge of the network. Edge computing, at a more general level, refers to the movement of compute and storage resources closer to, or into, smart endpoint devices in order to optimize total cost of ownership, reduce application latency, improve service capabilities, and improve compliance with security or data privacy requirements. Edge computing may in some scenarios provide a cloud-like distributed service, which offers orchestration and management for applications among many types of storage and compute resources. Edge computing may be further integrated with use cases and technology developed for the Internet-of-Things (IoT) and Fog networking, as endpoint devices and gateways attempt to access network resources and applications at locations moved closer to the "edge" of the network.

In these and other settings, edge computing attempts to offer reduced latency, increased responsiveness, and more available computing power than offered in traditional cloud network services and wide area network connections. Despite the rapid activity occurring with the development of standards and architectures involving these technologies, many limitations and technical problems still exist in the design and use of IoT, MEC, and next-generation edge networks.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1A:
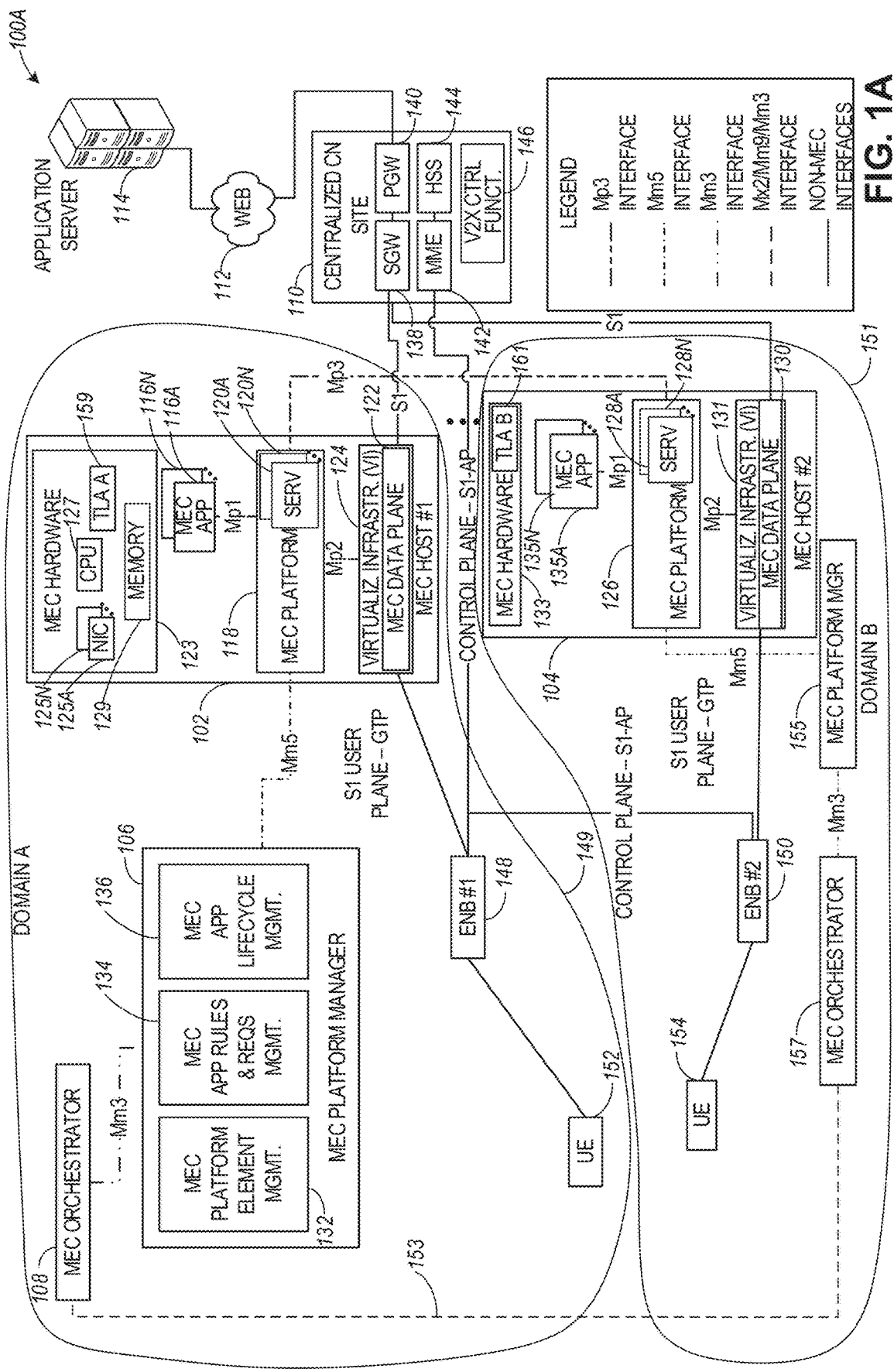
FIG. 1A illustrates a MEC communication infrastructure with a common core network and using trust establishment functionalities, according to an example.

In the following description, methods, configurations, and related apparatuses are disclosed for multi-domain trust establishment for edge architectures such as MEC-based architectures. As an overview, the technological solutions disclosed herein integrate MEC with various types of IoT or Fog networking implementations as well as multi-domain trust establishment. As is understood, MEC architectures offer application developers and content providers cloud-computing capabilities and an IT service environment at the edge of the network. This environment offers ultra-low latency and high bandwidth throughput as well as real-time access to radio network information that may be leveraged by applications. As used herein, the term "edge cloud" refers to a collection of computing resources or distributed computing implementations at the network edge.

MEC technology permits flexible and rapid deployments of innovative applications and services towards mobile subscribers, enterprises, or vertical segments in a variety of use cases, such as fifth generation (5G) network communications among automotive devices, including those use cases termed as vehicle-to-vehicle (V2V), vehicle-to-infrastructure (V2I), and vehicle-to-everything (V2X). As with most MEC installations, the goal with the present configurations is to bring the application endpoints as close to the vehicular environment, or other endpoints, as possible and to enable trusted communication exchanges in multi-domain communication architectures. These systems and techniques may be implemented in, or augment, virtualized environments which may be implemented within various types of MEC, network function virtualization (NFV) instances, or fully virtualized 5G network environments.

Public land mobile network (PLMN) operators (or service providers) may implement trust orchestration for a subset of an edge cloud architecture, cloudlets (e.g., a Fog-based network) and Enterprise Hybrid Clouds. For example, a service provider in PLMN A (e.g., in a country A) may have a subscriber base while a service provider in PLMN B (e.g., in a country B) may have a different subscriber base. As used herein, the term "domain" indicates a specific PLMN or other network delineation based on variety of parameters, such as geographic territory, network coverage, or client subscription. In edge ecosystem, a service provider can have a subscriber base that they manage (as is the case of Mobile Virtual Network Operators-MVNOs), hence any service provider can be associated with one or more "domains".

As used herein, the term "trust attributes" indicates various types of parameters, measurement, assertions, verifiable claims, attestable claims, or configurations that can be used for authorizing one or more network entities to communicate with each other. When tenant A from domain A wants to interact with tenant B from domain B, there is a need to establish rules of interaction based on, for example, an ad-hoc and domain-to-domain federation of "trust" (e.g., trust attributes by which tenant A and tenant B are authorized to interact). Federated trust parameters may require additional access restrictions over resources. Additionally, the granularity of access may be more constrained than intra-domain accesses. For example, access may identify specific files or workflows or other resources that can be accessed or may place tighter limits on the timeframe in which access is permitted.

Existing solutions for providing trust-related functionalities can be deficient, as explained hereinbelow. An Operational Level Agreement (OLA) can be used to represent the terms of service associated with a workload handoff between service provider(s) and operator(s). However, OLAs do not comprehend trust semantics such as tenant owned keys and data protection environment requirements.

A "Connect-Secure-Control-And-Observe" service (such as ISTIO, which is on open platform-independent service mesh that provides traffic management, policy enforcement and telemetry collection) defines an architecture for assigning identities, roles, and authorizations to "namespaces" (or containers) that uses both hop-by-hop and end-to-end payload protection based on Transport Layer Security (TLS) and Java Web Toolkit (JWT). Additionally, ISTIO depends on Secure Production Identity Framework for Everyone (SPIFFE) verifiable identities, but SPIFFE does not define attestation mechanisms for establishing trust in SPIFFE/ISTIO identities. ISTIO identities are synonymous with "namespaces" which is synonymous with "containers." ISTIO policies assume a single domain authorization and control and do not comprehend ad-hoc peer-domain crossings.

Object Security for Constrained RESTful Environments (OSCORE) defines hop-by-hop and end-to-end payload protection based on TLS, Datagram TLS (DTLS) and JWT. OSCORE, however, is merely a building block technology that leaves as an exercise the definition of domain contexts and semantics of inter-domain traversal. Incorporation of endpoint attestation schemes is also not defined by OSCORE.

RA-TLS is a method for augmenting a TLS handshake with attestation claim using X.509 identity certificate extensions. However, RA-TLS does not define how attestation claims may be used to make trust decisions and access control.

Even though the ETSI MEC Group Specification (GS) is defining a MEC architecture where different MEC systems can be connected, the ETSI MEC GS does not define how different MEC systems can securely communicate (e.g., in case they are belonging to different domains/MNOs).

Techniques disclosed herein use Trust Level Agreements (TLAs) that capture trust semantics for user equipment (UE) or a tenant working with MEC-based services (which can even belong to different MEC systems). In some aspects, MEC orchestrators (belonging to respective MEC systems) negotiate a TLA in the context of OLA agreements that ensure UE/tenant expectations for correct key management and data protection are met by the MEC infrastructure and ecosystem. A multi-tenant, multi-domain MEC infrastructure can be used to partition and isolate UE/tenant workloads that migrate according to roaming and OLA requirements. As used herein, the term "UE" can refer to user entity (e.g., user equipment), a network tenant, network service or application instance executed (provided) by the user equipment, or a service provider or principal that requires trust. By using a TLA as disclosed herein, trust can be effectively orchestrated across MEC domain boundaries. In aspects when attestation, key management, or workload isolation is required, these services and resources can be supplied in the context of traditional SLA/SLO and OLA agreements. Multi-tenant traffic does not get backhauled to backend and policy transfers may need to happen edge-to-edge in a secure and trustworthy manner. By using techniques disclosed herein for trusted communications using TLAs, multi-tenant subscriber traffic (i.e., spanning operators) on the edge as well as Edge-to-Edge roaming traffic can coordinate domain trust with the effectiveness and efficiency of OLA agreement. Additional functionalities related to multi-domain trust establishment using TLAs are discussed hereinbelow in connection with FIGS. 1A-15.

FIG. 1A illustrates a MEC communication infrastructure 100A with a common core network and using trust establishment functionalities, according to an example. The illustrated system is an implementation that operates within the ETSI MEC GS framework. The connections represented by some form of a dashed line (as noted in the legend in FIG. 1A) may be defined according to a specification from an ETSI MEC standards family or ETSI Network Function Virtualization (NFV) standards family. The MEC communication infrastructure 100A can include entities from a MEC-based architecture as well as entities from a third-generation partnership project (3GPP) based architecture located within multiple domains, such as domain A 149 and domain B 151.

The MEC communication infrastructure 100A can include a plurality of MEC hosts such as MEC hosts 102 and 104, MEC platform managers 106 and 155, and MEC orchestrators 108 and 157. The 3GPP based entities can include a centralized core network (CN) 110 coupled to an application server 114 via the network 112 (e.g., the Internet), as well as radio access networks (RANs) represented by base stations 148 and 150 coupled to corresponding user equipments (UEs) 152 and 154. The base stations 148 and 150 can include evolved Node-Bs (eNBs), Next Generation Node-Bs (gNBs), or other types of base stations operating in connection with a 3GPP wireless family of standards or another type of wireless standard.

In some aspects, the MEC communication infrastructure 100A can be implemented by different mobile network operators (MNOs) in the same country and/or in different countries, using different network traffic types. For example, domain A 149 and domain B 151 can correspond to different PLMNs managed by the different MNOs. As illustrated in FIG. 1A, radio access network associated with base station 148 (including MEC host 102, MEC platform manager 106, and MEC orchestrator 108) can be within a first PLMN (i.e., domain A 149 associated with a first mobile services provider or operator and a first network traffic type), and base station 150 (including MEC host 104, MEC platform manager 155, and MEC orchestrator 157) can be within a second PLMN (i.e., domain B 151 associated with a second mobile services provider or operator and a second network traffic type). As used herein, the terms "mobile services provider" and "mobile services operator" are interchangeable.

In this regard, the MEC communication infrastructure 100A can be associated with a multi-operator scenario composed by two (potentially geographically overlapping) coverage areas 149 and 151 where communication services (e.g., V2X services and MEC-based services) can be provided, with each coverage area being operated by a mobile services operator. Techniques disclosed herein can be used to multi-domain trust establishment using Trust Level Agreements (TLAs).

The solid line connections in FIG. 1A represent non-MEC connections, such as utilizing 3GPP cellular network connections S, S-AP, etc. Other connection techniques (e.g., protocols) and connections may also be used. Accordingly, in the scenario of FIG. 1A, the system entities (e.g., MEC orchestrators 108 and 157, MEC platform managers 106 and 155, MEC hosts 102 and 104 are connected by MEC (or NFV) logical links (indicated with dashed lines), in addition to network infrastructure links (e.g., a 5G Long Term Evolution (LTE) network, such as provided among UEs 152, 154, eNBs 148, 150, a CN site 110, etc.) (indicated with solid lines). A further connection to cloud services (e.g., an application server 114 access via the network 112) may also be connected via backhaul network infrastructure links from the CN 110.

Techniques disclosed herein apply to at least 2G/3G/4G/LTE/LTE-A (LTE Advanced) and 5G networks, with the examples and aspects disclosed using 4G/LTE networks. In aspects, the CN 110 may be an evolved packet core (EPC) network, a NextGen Packet Core (NPC) network, or some other type of CN (e.g., as illustrated in reference to FIGS. 2A-3B). In EPC (Evolved Packet Core), which is associated with 4G/LTE, the CN 110 can include a serving gateway (S-GW or SGW) 138, a packet data network (PDN) gateway (P-GW or PGW) 140, a mobility management entity (MME) 142, and a home subscriber server (HSS) 144 coupled to a V2X control function 146. In 5G, the Core Network is referred to as the NextGen Packet Network (NPC). In NPC, the S/P-GW is replaced with a user plane function (UPF), and the MME is replaced with two individual functional components, the Access Management Function (AMF) and the Session Management Function (SMF). The 4G HSS is split into different entities in 5G, namely, the Authentication Server Function (AUSF) and the Universal Data Management (UDM), with the subscription data being managed via the Universal Data Management (UDM) function. In EPC, the S1 interface can be split into two parts: the S1-U (user plane) interface which carries traffic data between the eNBs 148, 150 and the S-GW 138 via the MEC hosts 102, 104, and the S-AP (control plane) interface which is a signaling interface between the eNBs 148, 150 and the MME 142.

The MME 142 may be similar in function to the control plane of legacy Serving General Packet Radio Service (GPRS) Support Nodes (SGSN). The MME 142 may manage mobility aspects in access such as gateway selection and tracking area list management. The HSS 144 may comprise a database for network users, including subscription-related information to support the network entities' handling of communication sessions, including subscription information associated with V2X communications. The CN 110 may comprise one or several HSSs 144, depending on the number of mobile subscribers, on the capacity of the equipment, on the organization of the network, etc. For example, the HSS 144 can provide support for routing/roaming, authentication, authorization (e.g., V2X communication authorization), naming/addressing resolution, location dependencies, etc.

The S-GW 138 may terminate the S1 interface towards the RANs of eNBs 148, 150, and route data packets between the RANs and the CN 110. In addition, the S-GW 138 may be a local mobility anchor point for inter-RAN node handovers and also may provide an anchor for inter-3GPP mobility. Other responsibilities may include charging and some policy enforcement.

The P-GW 140 may terminate an SGi interface toward a PDN (not illustrated in FIG. 1A). The P-GW 140 may route data packets between the RANs and external networks such as a network including the application server (AS) 114 (alternatively referred to as application function (AF)) via an Internet Protocol (IP) interface (e.g., an interface to the network 112 coupled to the AS 114. The P-GW 140 can also communicate data to other external networks, which can include the Internet, IP multimedia subsystem (IPS) network, and other networks. Generally, the application server 114 may be an element offering applications that use IP bearer resources with the core network (e.g., UMTS Packet Services (PS) domain, LTE PS data services, etc.). The application server 114 can also be configured to support one or more communication services (e.g., Voice-over-Internet Protocol (VoIP) sessions, PTT sessions, group communication sessions, social networking services, etc.) for the UEs 152, 154 via the CN 110 and one or more of the MEC hosts 102, 104.

The P-GW 140 may further include a node for policy enforcement and charging data collection. A Policy and Charging Enforcement Function (PCRF) (not illustrated in FIG. 1A) can be the policy and charging control element of the CN 110. In a non-roaming scenario, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF may be communicatively coupled to the application server 114 via the P-GW 140. The application server 114 may signal the PCRF to indicate a new service flow and select the appropriate Quality of Service (QoS) and charging parameters.

The V2X control function 146 is used in connection with authorizing UEs to use V2X services based on HSS information (e.g., subscription information managed by the HSS 144), assist one or more UEs in obtaining the network address of an application server (e.g., 114) or a V2X application server, as well as providing V2X configuration parameters for direct communication (i.e., device-to-device communications). The interface for direct device-to-device (D2D) communication is referred to as PC5. The PC5 parameters may be provided by the V2X control function 146 to one or more UEs for purposes of configuring V2X communication between the UEs via a D2D communication link.

The MEC hosts 102, . . . , 104 can be configured in accordance with the ETSI GS MEC-003 specification. The MEC host 102 can include a MEC platform 118, which can be coupled to one or more MEC applications (apps) such as MEC apps 116A, . . . , 116N (collectively, MEC app 116) and to MEC data plane 122 within the virtualization infrastructure 124. The MEC app 166 can be a container, function as a service (FaaS), a virtual machine (VM), virtualized network functions (VNFs), and VNF components (VNFCs) (e.g., decomposed functions within the VNF which share the same trust properties as the VNF that the may be part of). The MEC platform 118 can also provide MEC services 120A, . . . , 120N (collectively, MEC service 120) to one or more devices coupled to the MEC host 102.

The MEC host 104 can include a MEC platform 126, which can be coupled to one or more MEC apps 135A, . . . , 135N (collectively, MEC app 135) and MEC data plane 130 within the virtualization infrastructure 131. The MEC platform 104 can also provide MEC services 128A, . . . , 128N (collectively, MEC service 128) to one or more devices coupled to the MEC host 104.

The MEC platform manager 106 can include a MEC platform element management module 132, MEC application rules and requirements management module 134, and MEC application lifecycle management module 136. The MEC platform manager 155 four MEC host 104 can include similar modules as MEC platform manager 106.

The MEC host 102 also includes MEC hardware 123, such as network interfaces (e.g. network interface cards or NICs) 125A, . . . , 125N, one or more CPUs 127, and memory 129. The MEC host 104 can also include MEC hardware 133 with similar components to MEC hardware 123 of MEC host 102. Additional description of the MEC related entities 102, 104, 106, and 108 are provided hereinbelow in connection with FIG. 4.

In some aspects, the MEC apps 116A, . . . , 116N and 135A, . . . , 135N can each provide an NFV instance configured to process network connections associated with a specific network traffic type (e.g., 2G, 3G, 4G, 5G or another network traffic type). In this regard, the terms "MEC app" and "NFV" (or "MEC NFV") are used interchangeably. Additionally, the term "NFV" and "NFV instance" are used interchangeably.

In aspects associated with network communications within the multi-domain MEC architecture 100A, applicable Trust Level Agreements (TLAs), Service Level Agreements (SLAs), and QoS compute requirements can be moved from a central office location (e.g., a data center) to one or more aggregation points (e.g., MEC hosts 102 and 104) near the base stations. Consequently, trusted wired and wireless communications (e.g., 2G, 3G, 4G, 5G, and other types of communications) can be performed by NFVs that are instantiated in the edge cloud facilities (e.g., MEC hosts), coexisting with other types of services handled by the MEC hosts (e.g., IoT communications including V2X communications) and using trust attributes based on one or more TLAs applicable within each domain. For example, MEC host 102 can store TLA 159 as part of MEC hardware 123, and MEC host 104 can store TLA 161 as part of MEC hardware 133. TLA 159 and TLA 161 can have structure and contents as described herein below and can be used for establishing and managing trusted connections between entities within the corresponding domains 149 and 151. In some aspects and as described in connection with several use cases illustrated in FIG. 5A-FIG. 8B, a common TLA can be negotiated between one or more network entities associated with multiple domains. A common TLA can include trust attributes that can be used by network entities within different domains to communicate with each other. In some aspects, after a common TLA has been negotiated between network entities from different domains, the common TLA can be populated within each domain or can be stored in shared memory or another network resource that can be accessed by network entities from each domain. For example, MEC orchestrators 108 and 157 can negotiate a common TLA via communication interface 153.

Even though TLAs 159 and 161 are illustrated as being implemented within the MEC hosts 102 and 104 (e.g., as stored within a memory device within the MEC hardware), the present disclosure is not limited in this regard and the TLAs can be stored or managed using other entities within the multi-domain MEC architecture 100A. For example, TLAs for each domain may be stored by shared memory (accessible to network entities within each domain) or can be stored at (and accessed from) other individual network entities such as MEC platform managers, MEC orchestrators or other MEC entities.

In some aspects, the structure of a TLA (such as TLAs 159 and 161 as well as any common TLAs as discussed hereinbelow in reference to FIGS. 5A-8B) may follow the structure of an Operational Level Agreement (OLA) but including considerations for trust establishment. In some aspects, the TLA may be expressed in terms of a data definition language such as XML, ASN.1, JSON or as an information token such as JWT (RFC7519) or CWT (RFC8392), where specific claims pertaining to trusted environments are asserted and may be secured through digital signatures over the claims.

In some aspects, TLAs discussed herein can include a calculus for representing, evaluating, and applying trust semantics including, for example, transitive trust relationships between applications and nodes that may also affect the OLA. For example, transitivity can be a logical expression such as "TLA X authorizes access from domain A to domain B" (which may be the same expression in an OLA) or it could be a function that finds allowable points of interaction given a policy P in a TLA (e.g., Function $F(PA,PB)=[A(pA0, pA1, \ldots pAn)'B(pB0, pB1, \ldots pBn)]$, where the pairings (pA0, pB0), (pA1, pB1), ..., (pAn, pBn) have semantically similar trust properties).

In some aspects, TLAs discussed herein may change or expire before all expected access or interaction completes. In some aspects, a Service Level Agreement (SLA) and a TLA can be cross-referenced. Hence, if a transaction based on a first SLA is superseded by a second SLA then either that transaction is aborted or it is allowed to complete, but a second transaction is not started. Since the SLA is cross-referenced in the TLA, the lifecycle semantics of the SLA can be applied to the TLA.

In some aspects, TLAs discussed herein can each include the following contents:

(1) Stakeholders—including domain identifiers and proxy identifiers (e.g. brokering devices or third party devices) for brokering just-in-time trust not provided for explicitly). The proxy entities can be used for providing a trusted connection between two network entities based on trust attributes of a TLA.

(2) Orchestrators (may imply specializing of security orchestration and control)—including orchestrator domain identifiers (identifying the domain the orchestrator is located in), orchestrator Identity (includes cryptographic identities), orchestrator roles, supported orchestrator functions for trust management, ranking order of orchestrators (e.g., primary, secondary, or tertiary), orchestrator connectivity (for example, may specify an Inter-MEC Communication Binding (IMCB) as a possible communication endpoint binding), and orchestrator availability.

(3) Trusted Resources (hardware or software resources that can be used for trusted communication)—including resource identity (includes cryptographic identities such as cryptographic keys), resource home domain identifiers (e.g., trusted orchestrators that can be used in connection with the resource), resource guest domain identifiers (for allowing a guest entity to query a resource) and trusted orchestrators that can be used by the guest entity, resource roles (e.g., specifying an application context and whether the resource is a service or application), resource type/functions/interfaces supported/scope, resource trust claims, trusted peers (peer resource identities (may include cryptographic identities), links to other TLAs containing resource details), trusted firewalls/gateways (e.g. domain entrance/exit points) including flow direction, throughput rates, proxies, and so forth, and signatures over trusted resources.

The resource trust claims (or properties) can include: manufacturer identity, product names/versions, compliance criteria (e.g., Common Criteria, FIPS, ISO900-, SIG validation suites, and so forth), group memberships (e.g., groups of resources that can be used together), environment establishment parameters (e.g., trusted boot measurements, kernel and OS measurements, VMM/hypervisor measurements (if applicable), hosting VM measurements (if applicable), computing context measurements (e.g. service containers, container engine, etc.)), computing context (or Trusted Execution Environment (TEE)) (including context type (e.g. SGX Enclave, VM, and so forth), context ID, context security version numbers (SVN), ISV SVNs, seed generation algorithms, random number generation algorithms, cryptographic algorithms, key types supported), trusted telemetry services, geographic location, secure storage services, properties of secure networking, parental controls, custom claims, and signatures over claims.

(4) Relevant Operational Level Agreements (OLAs).

(5) Relevant Service Level Agreements (SLAs) including relevant Service Level Objectives (SLOs).

(6) Relevant Underpinning Contracts (UCs).

(7) TLA Validity (including starting/ending date/time).

(8) Re-attestation triggers (e.g., a period of time expired, amount of data streamed, other utilization threshold, resources touched, entities visited, and so forth).

(9) Other TLAs—for example, baseline operator-to-operator TLAs, relative to which a current TLA is specialized.

(10) Exceptional behaviors—how operations/accesses not covered by the TLA may be handled or redirected for handling.

(11) Signatures over TLA, which includes signatures of one or more network entities generating or managing the TLA.

Figure 1B:
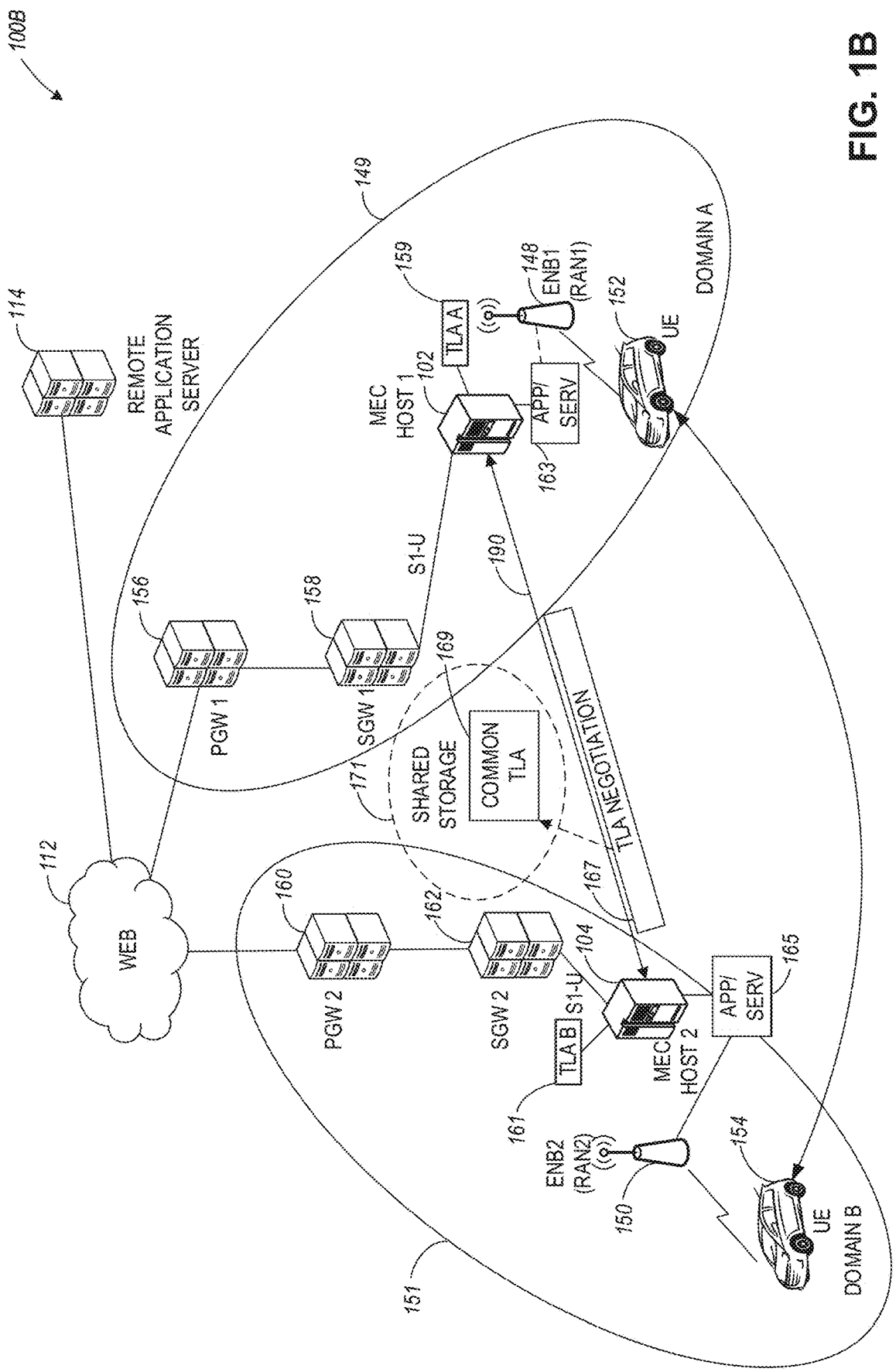
FIG. 1B illustrates a MEC communication infrastructure with separate core networks, radio access networks, and MEC hosts using trust establishment functionalities, according to an example.

FIG. 1B illustrates a MEC communication infrastructure 100B including separate core networks, radio access networks, and MEC hosts using trust establishment functionalities, according to an example. Referring to FIG. 1B, the MEC communication infrastructure 100B is similar to the MEC communication infrastructure 100A of FIG. 1A, except that each of the MEC hosts 102 and 104 in infrastructure 100B is coupled to a separate core network. More specifically, MEC host 102 is coupled to a first core network that includes SGW 158 and PGW 156. MEC host 104 is coupled to a second core network that includes SGW 162 and PGW 160. Both core networks can be coupled to the remote application server 114 via the network 112. Additionally, both core networks can be associated with different wireless protocols so that network traffic communications to and from the MEC hosts can be of different communication type.

As illustrated in FIG. 1B, MEC hosts 102 and 104 can be coupled to each other via a MEC-based interface 190, which can include an MP3 interface or another type of interface. Additionally, the MEC hosts can be located on the S1 interfaces of the core networks, downstream between the core network and the corresponding RANs of eNBs 148 and 150. In some aspects and as illustrated in FIG. 1B, UEs 152 and 154 can be located within vehicles or other mobile devices.

As illustrated in FIG. 1B, NFV 190B is instantiated within MEC host 104 and is configured to process communications with eNB 150, an application (or service) 163 is instantiated within MEC host 102 and is configured to process communications with eNB 148. Similarly, an application (or service) 165 is instantiated within MEC host 104 and is configured to process communications with eNB 150. In some aspects, MEC applications 165 and 163 can include NFV instances. Communications between the MEC apps 163/165 and the corresponding eNBs can be based on different wireless protocols. TLA 161 can be configured to provide trusted attributes for configuring and managing trusted connections within domain 151, and TLA 159 can be configured to provide trusted attributes for configuring and managing trusted connections within domain 149.

In some aspects, MEC host 102 and MEC host 104 can perform TLA negotiation 167 using TLAs 161 and 159 to generate a common TLA 169. For example, during the TLA negotiation 167, each MEC host can provide one or more trusted attributes from its own TLA to the other MEC host for approval or changes. The TLA negotiation process 167 can include several rounds of trust attributes exchanges until the common TLA 169 is reached as a final result of the negotiation. In some aspects, the common TLA 169 can be stored in a storage 171 which can be shared between domains 149 and 151. In some aspects, the TLA negotiation 167 can be performed between MEC services (e.g., 165 and 163) executing on respective MEC hosts 104 and 102.

Even though FIG. 1B illustrates the TLA negotiation 167 being performed by MEC hosts 102 and 104 via interface 190, the disclosure is not limited in this regard and other MEC entities within each of domains 149 and 151 (e.g., MEC platform managers, MEC orchestrators, or other MEC entities) can perform the TLA negotiation.

In some aspects, different trigger events can be used for initiating the TLA negotiation 167. For example and as illustrated in the use cases in FIG. 5A-FIG. 8B, a trigger event initiating the TLA negotiation can include the UE in one domain requesting connection to entity in another domain (e.g., another UE); the UE roaming from a first domain to a second domain and requesting access to service or application in the first domain; and a service is migrated from one domain to another domain; or another type of trigger event such as a combination of the above trigger events.

Figure 2A:
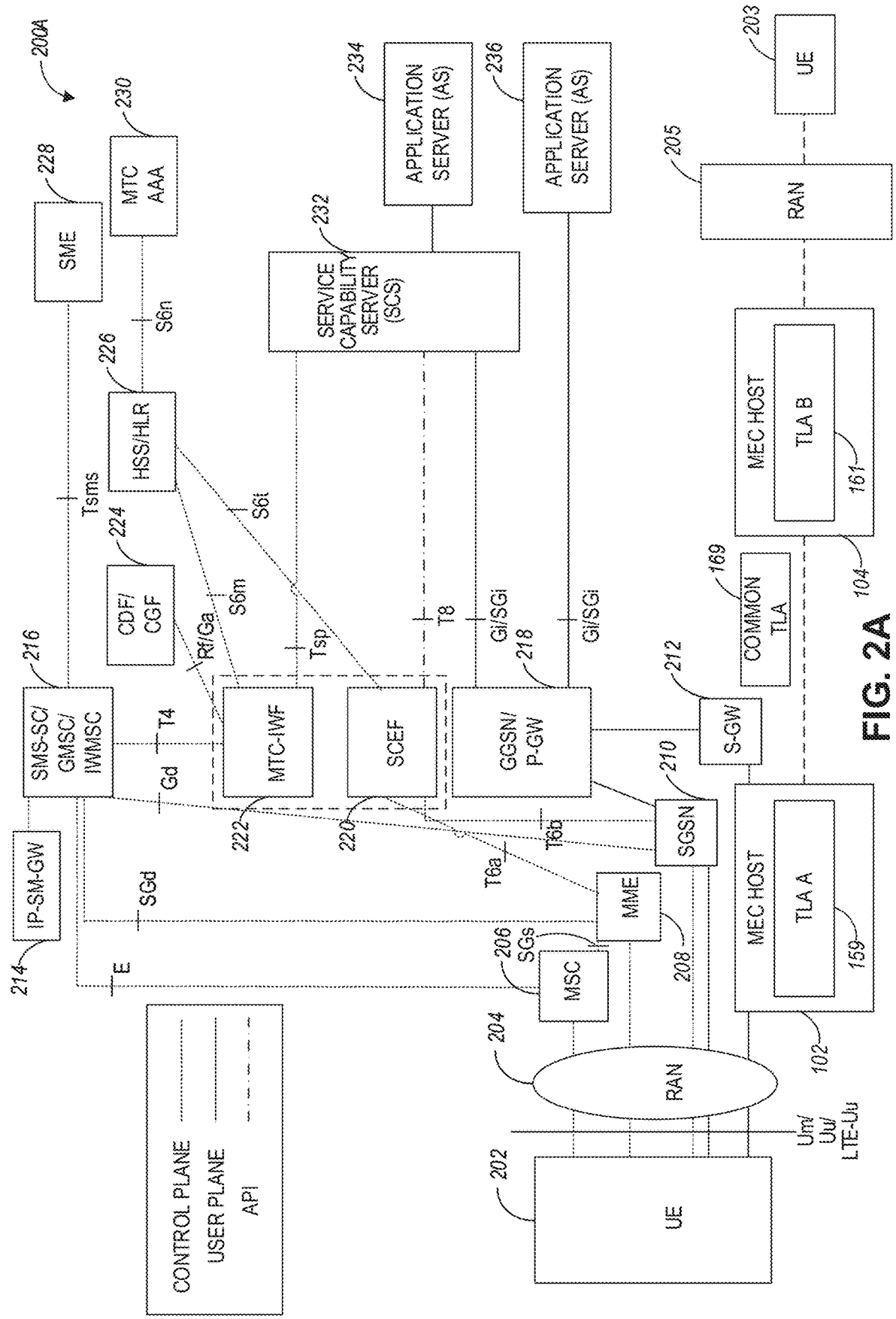
FIG. 2A illustrates an example Cellular Internet-of-Things (CIoT) network architecture with a MEC host using trust establishment functionalities, according to an example.

FIG. 2A illustrates an example Cellular Internet-of-Things (CIoT) network architecture with a MEC host using trust establishment functionalities, according to an example. Referring to FIG. 2A, the CIoT architecture 200A can include the UE 202 and the RAN 204 coupled to a plurality of core network entities. In some aspects, the UE 202 can be a machine-type communication (MTC) UE. The CIoT network architecture 200A can further include a mobile services switching center (MSC) 206, MME 208, a serving GPRS support node (SGSN) 210, a S-GW 212, an IP-Short-Message-Gateway (IP-SM-GW) 214, a Short Message Service-Service Center (SMS-SC)/gateway mobile service center (GMSC)/Interworking MSC (IWMSC) 216, MTC interworking function (MTC-IWF) 222, a Service Capability Exposure Function (SCEF) 220, a gateway GPRS support node (GGSN)/Packet-GW (P-GW) 218, a charging data function (CDF)/charging gateway function (CGF) 224, a home subscriber server (HSS)/a home location register (HLR) 226, short message entities (SME) 228, MTC authorization, authentication, and accounting (MTC AAA) server 230, a service capability server (SCS) 232, and application servers (AS) 234 and 236. In some aspects, the SCEF 220 can be configured to securely expose services and capabilities provided by various 3GPP network interfaces. The SCEF 220 can also provide means for the discovery of the exposed services and capabilities, as well as access to network capabilities through various network application programming interfaces (e.g., API interfaces to the SCS 232).

FIG. 2A further illustrates various reference points between different servers, functions, or communication nodes of the CIoT network architecture 200A. Some example reference points related to MTC-IWF 222 and SCEF 220 include the following: Tsms (a reference point used by an entity outside the 3GPP network to communicate with UEs used for MTC via SMS), Tsp (a reference point used by a SCS to communicate with the MTC-IWF related control plane signaling), T4 (a reference point used between MTC-IWF 222 and the SMS-SC 216 in the HPLMN), T6a (a reference point used between SCEF 220 and serving MME 208), T6b (a reference point used between SCEF 220 and serving SGSN 210), T8 (a reference point used between the SCEF 220 and the SCS/AS 234, 236), S6m (a reference point used by MTC-IWF 222 to interrogate HSS/HLR 226), S6n (a reference point used by MTC-AAA server 230 to interrogate HSS/HLR 226), and S6t (a reference point used between SCEF 220 and HSS/HLR 226).

In some aspects, the UE 202 can be configured to communicate with one or more entities within the CIoT architecture 200A via the RAN 204 (e.g., CIoT RAN) according to a Non-Access Stratum (NAS) protocol, and using one or more radio access configuration, such as a narrowband air interface, for example, based on one or more communication technologies, such as Orthogonal Frequency-Division Multiplexing (OFDM) technology. As used herein, the term "CIoT UE" refers to a UE capable of CIoT optimizations, as part of a CIoT communications architecture. In some aspects, the NAS protocol can support a set of NAS messages for communication between the UE 202 and an Evolved Packet System (EPS) Mobile Management Entity (MME) 208 and SGSN 210. In some aspects, the CIoT network architecture 200A can include a packet data network, an operator network, or a cloud service network, having, for example, among other things, servers such as the Service Capability Server (SCS) 232, the AS 234, or one or more other external servers or network components.

The RAN 204 can be coupled to the HSS/HLR servers 226 and the AAA servers 230 using one or more reference points including, for example, an air interface based on an S6a reference point, and configured to authenticate/authorize CIoT UE 202 to access the CIoT network. The RAN 204 can be coupled to the CIoT network architecture 200A using one or more other reference points including, for example, an air interface corresponding to an SGi/Gi interface for 3GPP accesses. The RAN 204 can be coupled to the SCEF 220 using, for example, an air interface based on a T6a/T6b reference point, for service capability exposure. In some aspects, the SCEF 220 may act as an API GW towards a third-party application server such as server 234. The SCEF 220 can be coupled to the HSS/HLR 226 and MTC AAA 230 servers using an S6t reference point and can further expose an Application Programming Interface to network capabilities.

In certain examples, one or more of the CIoT devices disclosed herein, such as the UE 202, the RAN 204, etc., can include one or more other non-CIoT devices, or non-CIoT devices acting as CIoT devices, or having functions of a CIoT device. For example, the UE 202 can include a smartphone, a tablet computer, or one or more other electronic device acting as a CIoT device for a specific function, while having other additional functionality. In some aspects, the RAN 204 can include a CIoT enhanced Node B (CIoT eNB) communicatively coupled to a CIoT Access Network Gateway (CIoT GW). In certain examples, the RAN 204 can include multiple base stations (e.g., CIoT eNBs or other types of base stations) connected to the CIoT GW, which can include MSC 206, MME 208, SGSN 210, or S-GW 212. In certain examples, the internal architecture of RAN 204 and the CIoT GW may be left to the implementation and need not be standardized.

In some aspects, the CIoT architecture 200A can include one or more MEC hosts that can provide a communication link between different components of the CIoT architecture. For example, MEC host 102 can be coupled between the RAN 204 and the S-GW 212. In this case, the MEC host 102 can use one or more NFV instances to process wireless connections with the RAN 204 and the S-GW 212. The MEC host 102 can also be coupled to another MEC host 104 associated with RAN 205 and a UE 203. UE 203, RAN 205, and MEC host 104 can be associated with a domain (e.g., PLMN) that is different from a domain associated with UE 202, RAN 204, and MEC host 102. In some aspects, UE 202 can request a connection with UE 203 and MEC hosts 102 and 104 can conduct TLA negotiation for generating a common TLA 169. The common TLA 169 can be populated within both domains and can be available to both MEC hosts 102 and 1044 purposes of establishing and managing a trusted connection between UEs 202 and 203 using trust attributes within the common TLA 169.

Figure 2B:
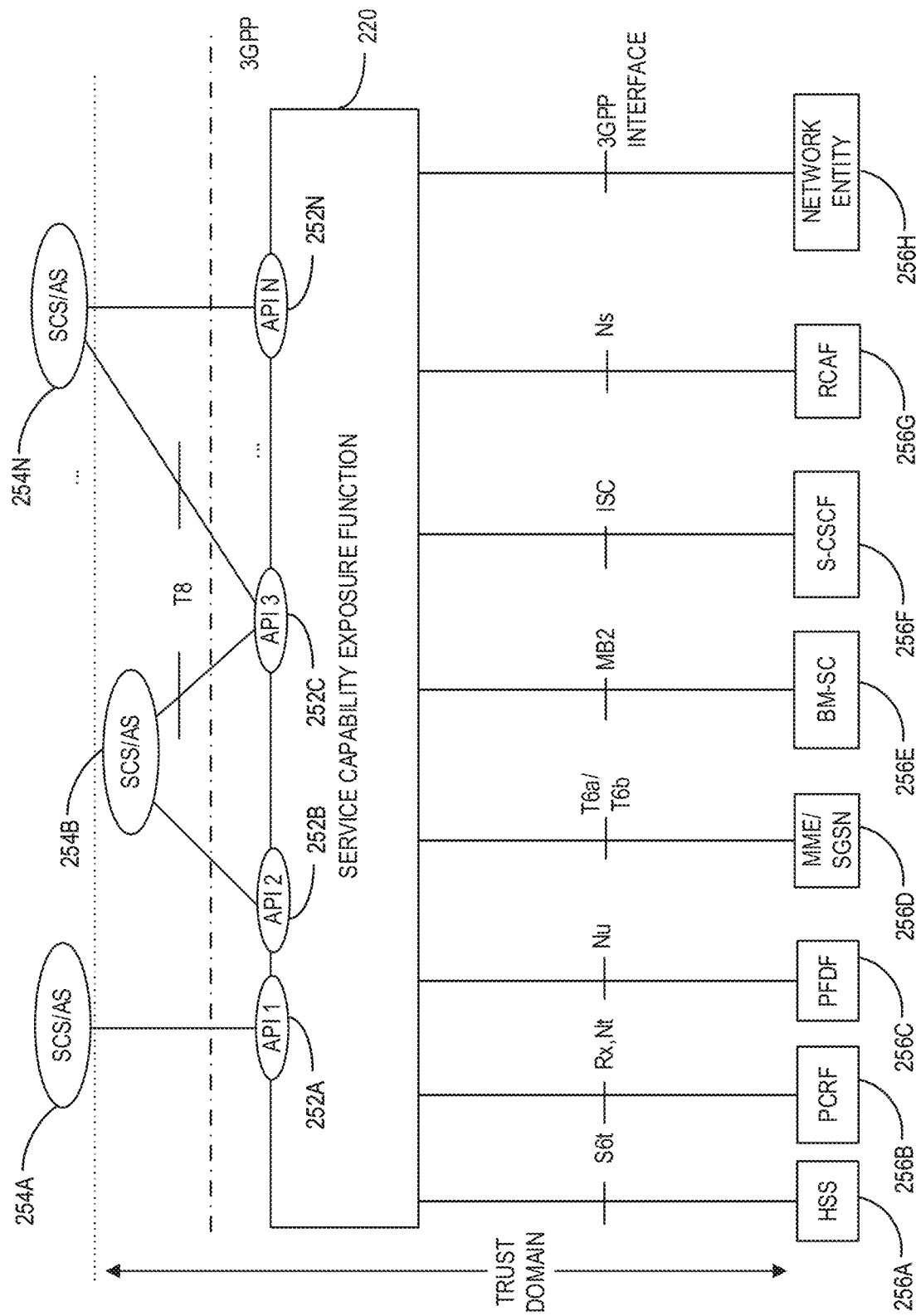
FIG. 2B illustrates an example Service Capability Exposure Function (SCEF) used by the CIoT network architecture of FIG. 2A, according to an example.

FIG. 2B illustrates an example Service Capability Exposure Function (SCEF) used by the CIoT network architecture of FIG. 2B, according to an example. Referring to FIG. 2B, the SCEF 220 can be configured to expose services and capabilities provided by 3GPP network interfaces to external third-party service provider servers hosting various applications. In some aspects, a 3GPP network such as the CIoT architecture 200A, can expose the following services and capabilities: a home subscriber server (HSS) 256A, a policy and charging rules function (PCRF) 256B, a packet flow description function (PFDF) 256C, a MME/SGSN 256D, a broadcast multicast service center (BM-SC) 256E, a serving call server control function (S-CSCF) 256F, a RAN congestion awareness function (RCAF) 256G, and one or more other network entities 256H. The above-mentioned services and capabilities of a 3GPP network can communicate with the SCEF 220 via one or more interfaces as illustrated in FIG. 2B. The SCEF 220 can be configured to expose the 3GPP network services and capabilities to one or more applications running on one or more service capability server (SCS)/application server (AS), such as SCS/AS 254A, 254B, ..., 254N. Each of the SCS/AS 254A-254N can communicate with the SCEF 220 via application programming interfaces (APIs) 252A, 252B, 252C, ..., 252N, as seen in FIG. 2B.

Figure 3A:
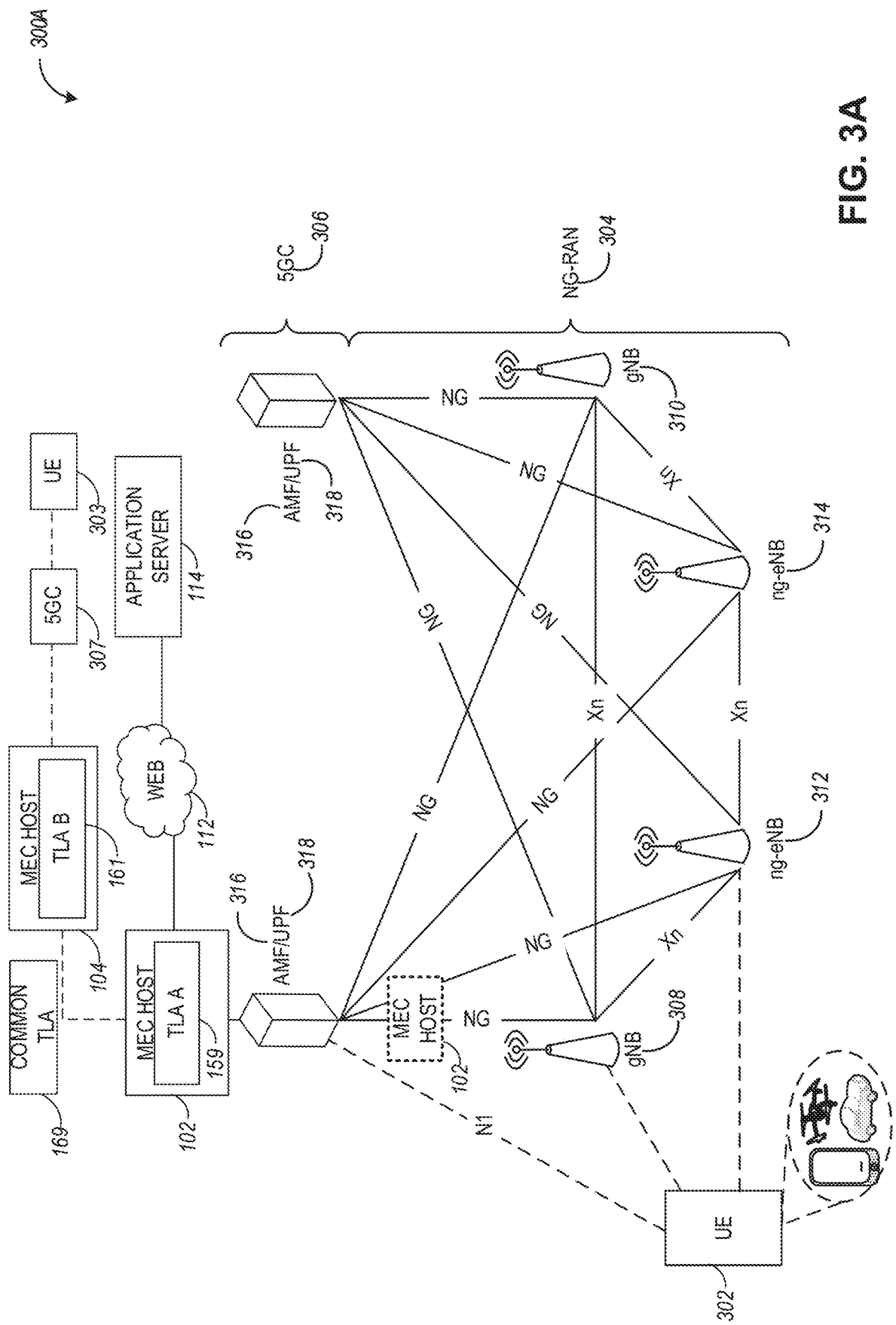
FIG. 3A is a simplified diagram of an exemplary Next-Generation (NG) system architecture with a MEC host using trust establishment functionalities, according to an example.

FIG. 3A is a simplified diagram of an exemplary Next-Generation (NG) system architecture with a MEC host using trust establishment functionalities, according to an example. Referring to FIG. 3A, the NG system architecture 300A includes NG-RAN 304 and a 5G network core (5GC) 306. The NG-RAN 304 can include a plurality of NG-RAN nodes, for example, gNBs 308 and 310, and NG-eNBs 312 and 314. The gNBs 308/310 and the NG-eNBs 312/314 can be communicatively coupled to the UE 302 via a wireless connection. The core network 306 (e.g., a 5G core network or 5GC) can include an access and mobility management function (AMF) 316 or a user plane function (UPF) 318. The AMF 316 and the UPF 318 can be communicatively coupled to the gNBs 308/310 and the NG-eNBs 312/314 via NG interfaces. More specifically, in some aspects, the gNBs 308/310 and the NG-eNBs 312/314 can be connected to the AMF 316 by N2 interface, and to the UPF 318 by N3 interface. The gNBs 308/310 and the NG-eNBs 312/314 can be coupled to each other via Xn interfaces.

In some aspects, a gNB 308 can include a node providing New Radio (NR) user plane and control plane protocol termination towards the UE and can be connected via the NG interface to the 5GC 306. In some aspects, an NG-eNB 312/314 can include a node providing evolved universal terrestrial radio access (E-UTRA) user plane and control plane protocol terminations towards the UE and is connected via the NG interface to the 5GC 306. In some aspects, any of the gNBs 308/310 and the NG-eNBs 312/314 can be implemented as a base station (BS), a mobile edge server, a small cell, a home eNB, although aspects are not so limited.

In some aspects, the NG system architecture 300A can include one or more MEC hosts that can provide a communication link between different components of the NG architecture. For example, MEC host 102 can provide an interface between the AMF 316 (or UPF 318) in the 5GC 306 and the application server 114. The MEC host 102 can use one or more NFV instances to process wireless connections with the 5GC 306 and the application server 114. The MEC host 102 can also be coupled to another MEC host 104 associated with 5GC 307 and a UE 303. UE 303, 5GC 307, and MEC host 104 can be associated with a domain (e.g., PLMN) that is different from a domain associated with UE 302, 5GC 306, and MEC host 102. In some aspects, UE 302 can request a connection with UE 303 and MEC hosts 102 and 104 can conduct TLA negotiation for generating a common TLA 169. The common TLA 169 can be populated within both domains and can be available to both MEC hosts 102 and 1044 purposes of establishing and managing a trusted connection between UEs 302 and 303 using trust attributes within the common TLA 169.

Figure 3B:
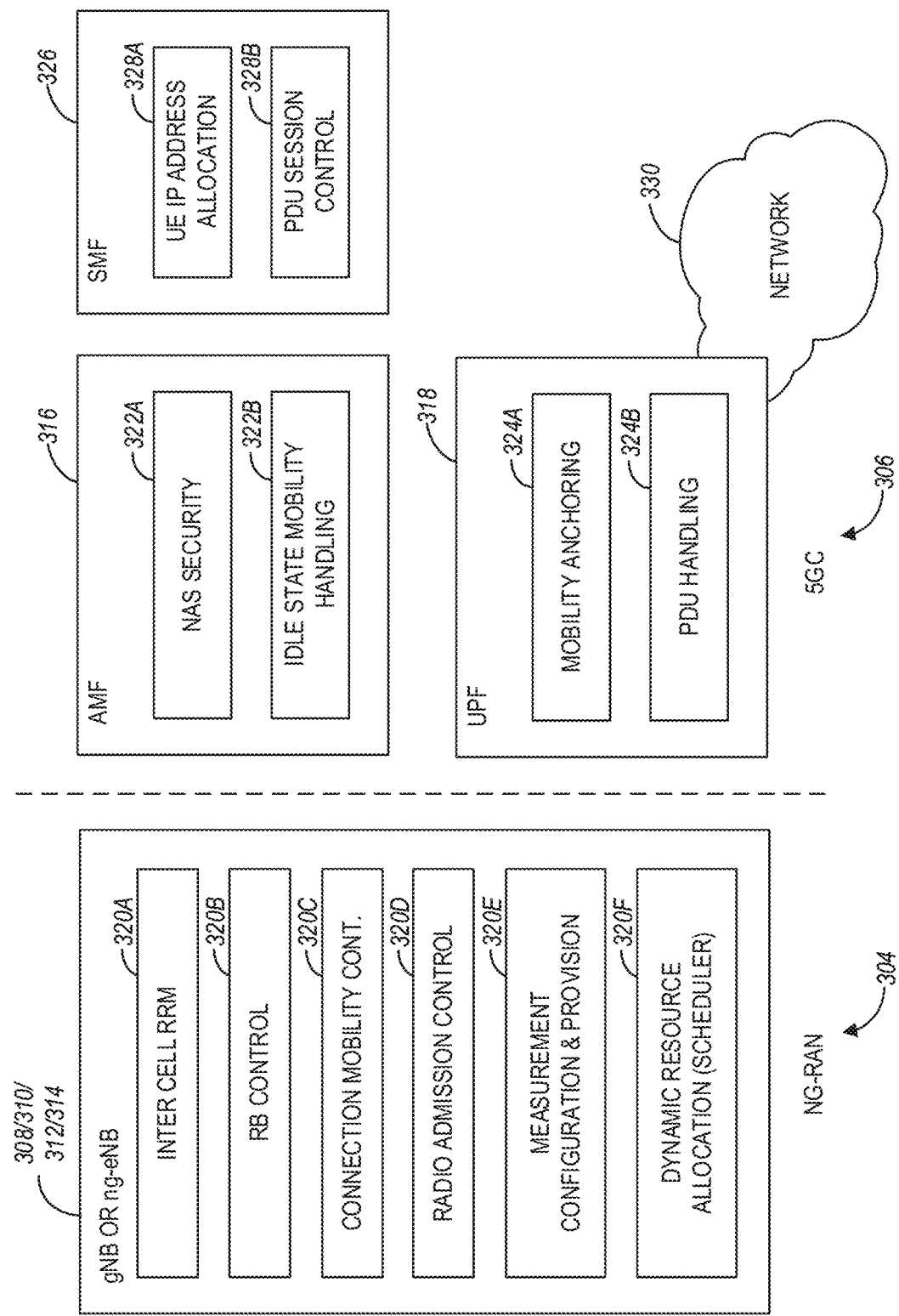
FIG. 3B illustrates an exemplary functional split between next generation radio access network (NG-RAN) and the 5G Core network (5GC) in connection with the NG system architecture of FIG. 3A, according to an example.

FIG. 3B illustrates an exemplary functional split between next generation radio access network (NG-RAN) and the 5G Core network (5GC) in connection with the NG system architecture of FIG. 3A, according to an example. FIG. 3B illustrates some of the functionalities the gNBs 308/310 and the NG-eNBs 312/314 can perform within the NG-RAN 304, as well as the AMF 316, the UPF 318, and a Session Management Function (SMF) 326 (not illustrated in FIG. 3A) within the 5GC 306. In some aspects, the 5GC 306 can provide access to a network 330 (e.g., the Internet) to one or more devices via the NG-RAN 304.

In some aspects, the gNBs 308/310 and the NG-eNBs 312/314 can be configured to host the following functions: functions for Radio Resource Management (e.g., inter-cell radio resource management 320A, radio bearer control 320B, connection mobility control 320C, radio admission control 320D, measurement and measurement reporting configuration for mobility and scheduling 320E, and dynamic allocation of resources to UEs in both uplink and downlink (scheduling) 320F); IP header compression; encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); transport level packet marking in the uplink; session management; support of network slicing; QoS flow management and mapping to data radio bearers; support of UEs in RRC_INACTIVE state; distribution function for non-access stratum (NAS) messages; radio access network sharing; dual connectivity; and tight interworking between NR and E-UTRA, to name a few.

In some aspects, the AMF 316 can be configured to host the following functions, for example: NAS signaling termination; NAS signaling security 322A; access stratum (AS) security control; inter-core network (CN) node signaling for mobility between 3GPP access networks; idle state/mode mobility handling 322B, including mobile device, such as a UE reachability (e.g., control and execution of paging retransmission); registration area management; support of intra-system and inter-system mobility; access authentication; access authorization including check of roaming rights;

mobility management control (subscription and policies); support of network slicing; or SMF selection, among other functions.

The UPF 318 can be configured to host the following functions, for example: mobility anchoring 324A (e.g., anchor point for Intra-/Inter-RAT mobility); packet data unit (PDU) handling 324B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session; QoS handling for user plane, e.g., packet filtering, gating, UL/DL rate enforcement; uplink traffic verification (SDF to QoS flow mapping); or downlink packet buffering and downlink data notification triggering, among other functions.

The Session Management function (SMF) 326 can be configured to host the following functions, for example: session management; UE IP address allocation and management 328A; selection and control of user plane function (UPF); PDU session control 328B, including configuring traffic steering at UPF 318 to route traffic to proper destination; control part of policy enforcement and QoS; or downlink data notification, among other functions.

Figure 4:
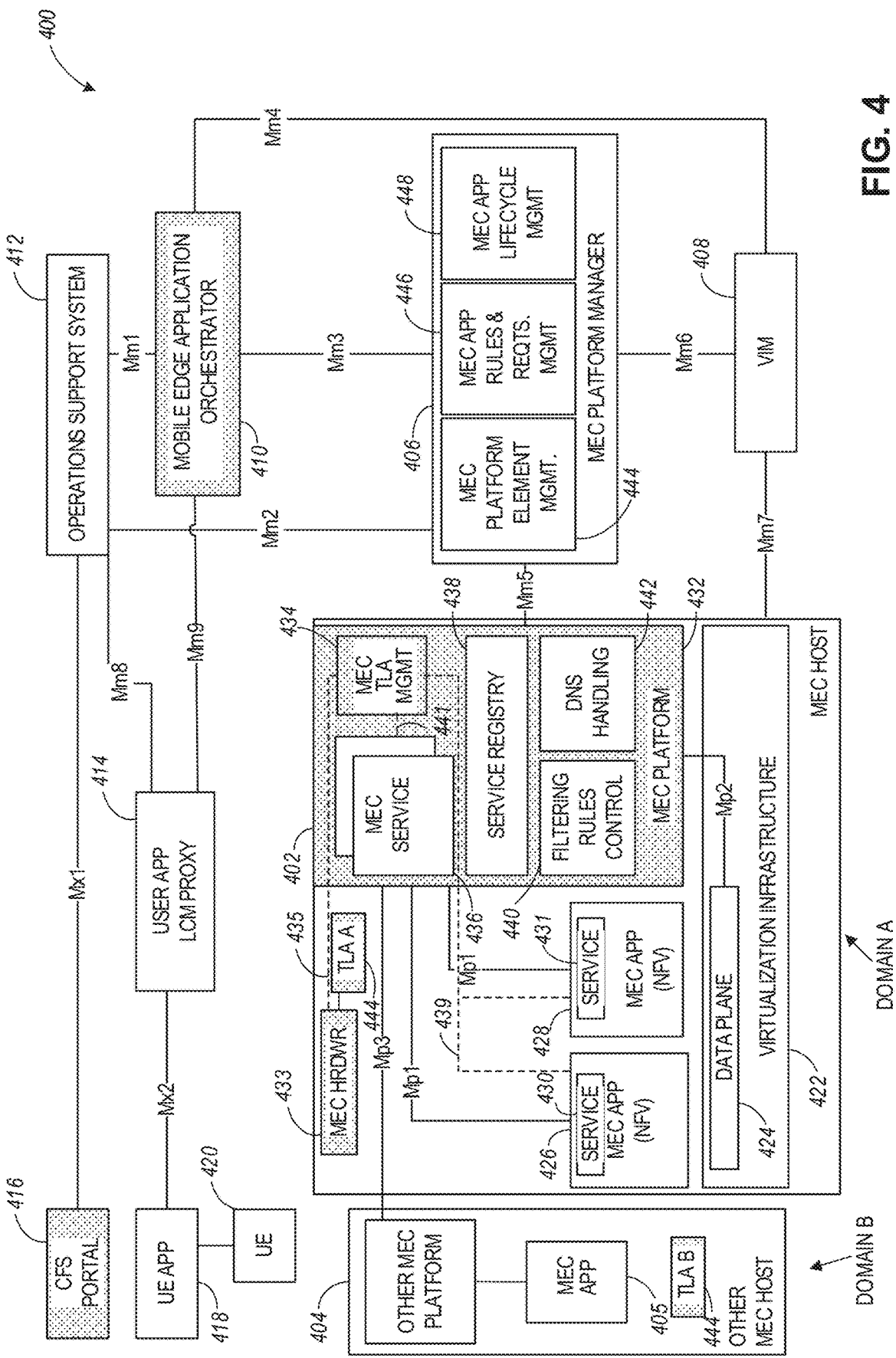
FIG. 4 illustrates a MEC network architecture modified for supporting trust establishment functionalities, according to an example.

FIG. 4 illustrates a MEC network architecture 400 modified for supporting trust establishment functionalities, according to an example. FIG. 4 specifically illustrates a MEC architecture 400 with MEC hosts providing functionalities in accordance with the ETSI GS MEC-003 specification, with the shaded blocks used to indicate processing aspects for the MEC architecture configuration described herein in connection with multi-domain trust establishment. Specifically, enhancements to the MEC platform 432, the MEC hardware 433, the MEC orchestrator, and the customer-facing service (CFS) portal 416 may be used for multi-domain trust establishment using TLAs as well as managing TLAs within the MEC architecture 400. This may include initial setup and provisioning of a TLA within a domain, negotiating common TLAs with other domains, updating existing TLAs, as well as other trust-related functionalities within the MEC architecture 400.

Referring to FIG. 4, the MEC network architecture 400 can include MEC hosts 402 (in domain A) and 404 (in domain B), a virtualization infrastructure manager (VIM) 408, an MEC platform manager 406, an MEC orchestrator 410, an operations support system 412, a user app proxy 414, a UE app 418 running on UE 420, and CFS portal 416. The MEC host 402 can include a MEC platform 432 with filtering rules control module 440, a DNS handling module 442, service registry 438, and MEC services 436. The MEC apps (or NFVs) 426 and 428 can be instantiated upon virtualization infrastructure 422 that includes a data plane 424. The MEC apps 426 and 428 can be configured to provide services 430/431, which can include processing network communications traffic of different types associated with one or more wireless connections (e.g., connections to one or more RAN or core network entities as illustrated in FIGS. 1A-3B). The MEC hardware 433 and the at least one scheduler 437 can be similar to the MEC hardware 123 and the scheduler 120 discussed in connection with FIG. 1A.

The MEC platform manager 406 can include MEC platform element management module 444, MEC app rules and requirements management module 446, and MEC app life-cycle management module 448. The various entities within the MEC architecture 400 can perform functionalities as disclosed by the ETSI GS MEC-003 specification.

In some aspects, the MEC architecture 400 can provide functionalities for trust establishment using TLAs. For example, the MEC platform 432 can include a MEC TLA management module 434 that may comprise suitable circuitry, logic, interfaces, and/or code and is configured to provide trust-related functionalities within domain A. More specifically, the MEC TLA management module 434 can provide an interface (e.g., to an MNO of the domain) for setting up and managing a TLA 444 associated with trust-related functions within domain A. In some aspects, such management interface can be provided via the CFS portal 416 and the MEC orchestrator 410. In some aspects, the MEC TLA management module 434 can use communication links 439 and 441 with the MEC apps 426/428 and the MEC service 436 to detect various requests for functionality within the MEC architecture 400 that may need trusted communication links. In this regard, the MEC TLA management module 434 can also be configured to generate the TLA 444 automatically, based on existing or previously used trust attributes associated with the MEC apps 426/428 and the MEC service 436. After the TLA 444 is generated, it can be stored as part of the MEC hardware 433 via communication link 435. Additionally, the MEC TLA management module 434 can be configured to perform TLA negotiation with MEC entities other domains in order to generate a common TLA that can be used for communication between the domains.

In some aspects, trust-related functionalities for managing TLAs can be implemented within other MEC entities outside of the MEC host 402, such as the MEC orchestrator 410 or the MEC platform manager 406. In some aspects, other MEC entities (e.g., MEC host 404) located in different domains (e.g., domain B) can use a similar MEC TLA management module to manage TLA-related functions, such as generating TLA 444 for domain B, negotiating common TLAs, and other trust-related functions.

Figure 5A:
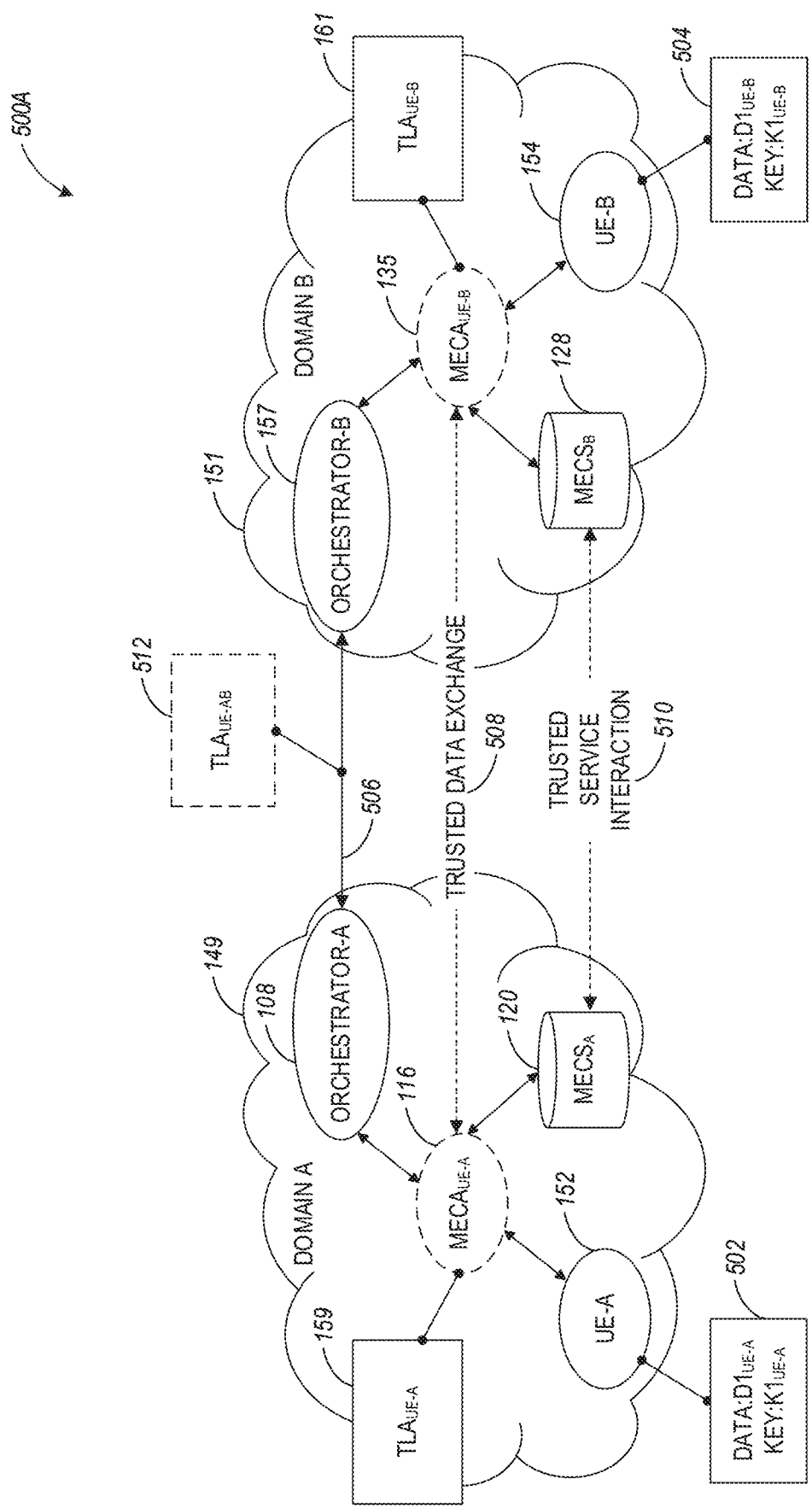
FIG. 5A illustrates communication between MEC entities in a MEC architecture including different domains based on negotiated domain-to-domain trust, according to an example.

FIG. 5A illustrates communication between MEC entities in a MEC architecture 500A including different domains based on negotiated domain-to-domain trust, according to an example. Referring to FIG. 5A, the MEC architecture 500A includes MEC entities illustrated in FIG. 1A associated with domain 149 and domain 151. Domain 149 includes UE 152, MEC app 116, MEC service 120, and MEC orchestrator 108. Domain 151 includes UE 154, MEC app 135, MEC service 128, and MEC orchestrator 157.

The UEs 152 and 154 are represented as the endpoints of communication, with data/key packages 502 and 504 representing endpoint data and keys used by the UEs 152 and 154 for a trusted communication. Even though UEs 152 and 154 are represented in FIG. 5A as the endpoints, the disclosure is not limited in this regard and an application, a service, or a service chain can be used in place of the UEs. Additionally, resources within the MEC architecture 500A can be partitioned according to multi-tenant resource partitioning schemes.

In FIG. 5A, UE 152 in domain A 149 (MEC system A) intends to establish trusted interactions with a UE 154 in domain B 151 (MEC system B). Interactions may be brokered between either the MEC app (MECA) agents (the MEC orchestrators (MECO) 108 and 157 respectively for $MECA_{UE-A}$ 116 and $MECA_{UE-B}$ 135) or between MEC services (MECS) (e.g., $MECS_A$ 120 and $MECS_B$ 128 where subscripts A and B indicate to which domain each entity belongs). In the latter case, the communication can be performed via an Mp3 reference point defined in the ETSI GS MEC-003 specification. In some aspects, the Mp3 interface can be enhanced, in the framework of the present disclosure, to enable an inter-MEC system communication binding (IMCB) and transfer of TLAs between different MEC systems.

The MECA$_{UE-A}$ 116 services a request (e.g., from UE 152) to connect to UE-B 154 by supplying a current TLA 159 for UE-A to domain A's orchestrator 108. The TLA 159 can include a set of attestation attributes pertaining to both the UE-A 152 and MECA$_U$E-A 116 operating environments. As used herein, the term "operating environment" indicates a set of communication links or other interactions associated with a network entity. In some aspects, the initial TLA context reflected in TLA 159 can be set up when the UE 152 device roams or is otherwise onboarded into domain 149. Similarly, TLA 161 can include a set of attestation attributes pertaining to UE 154 and MECA 135 operating environments.

MECA$_{UE-A}$ 116 and MECS$_A$ 120 may cache various credentials, tokens, and attribute values both for its own efficiency and for any subsequent inter-domain trusted services interactions. Roaming between domain 149 and domain 151 may be a frequent activity for a given UE, and these credential caches may be stored for a length of time (e.g., time-to-live) as encapsulated objects in each or either domain's network for low latency establishments of the needed/applicable TLAs. In some aspect, TLA policies may produce a stateful context with the various entities employed to implement these requirements. When a TLA changes, the cached items logically may no longer be valid. Part of TLA expiry/replacement may involve tracking and/or invalidating cached state to ensure operation reflects trust policy.

MEC orchestrator 108 establishes a connection 506 to MEC orchestrator (MECO) 157 based on a request to establish either a Trusted Data Exchange 508 between MECA$_{UE-A}$ 116 and MECA$_{UE-B}$ 135 or a Trusted Service Interaction 510 between MECS$_A$ 120 and MECS$_B$ 128 to achieve the connection to UE 154 requested by UE 152. To accomplish this, MECO 108 presents a common TLA 512 (TLA$_{UE-AB}$) which is a proposal to MECO 157 to determine whether a trusted computing environment can be established between the peer MECA (or MECS) nodes. Upon acceptance of a proposal (which may include several communication exchanges between the orchestrators), either or both of the orchestrators may cache the arrived-at common TLA 512 for accelerating such roaming in the future. Furthermore, the accepted common TLA may also be signed and entered into a shared database or a distributed ledger for transparency and verification of performed mapping by either domain upon request by UE$_A$ 152 or UE$_B$ 154. Respective domain orchestrators (e.g., 108 and 157) can provide the capability to perform policy-based configurable revocation management thereby allowing a grade of TLAs for any given session and caching such TLAs for future reuse. Revocation/whitelist can be tracked via distributed ledger for record keeping and auditing. Based on the revoked resources (e.g. specific accelerators or IP with specific software/firmware versions), MEC services can renegotiate TLAs.

Figure 5B:
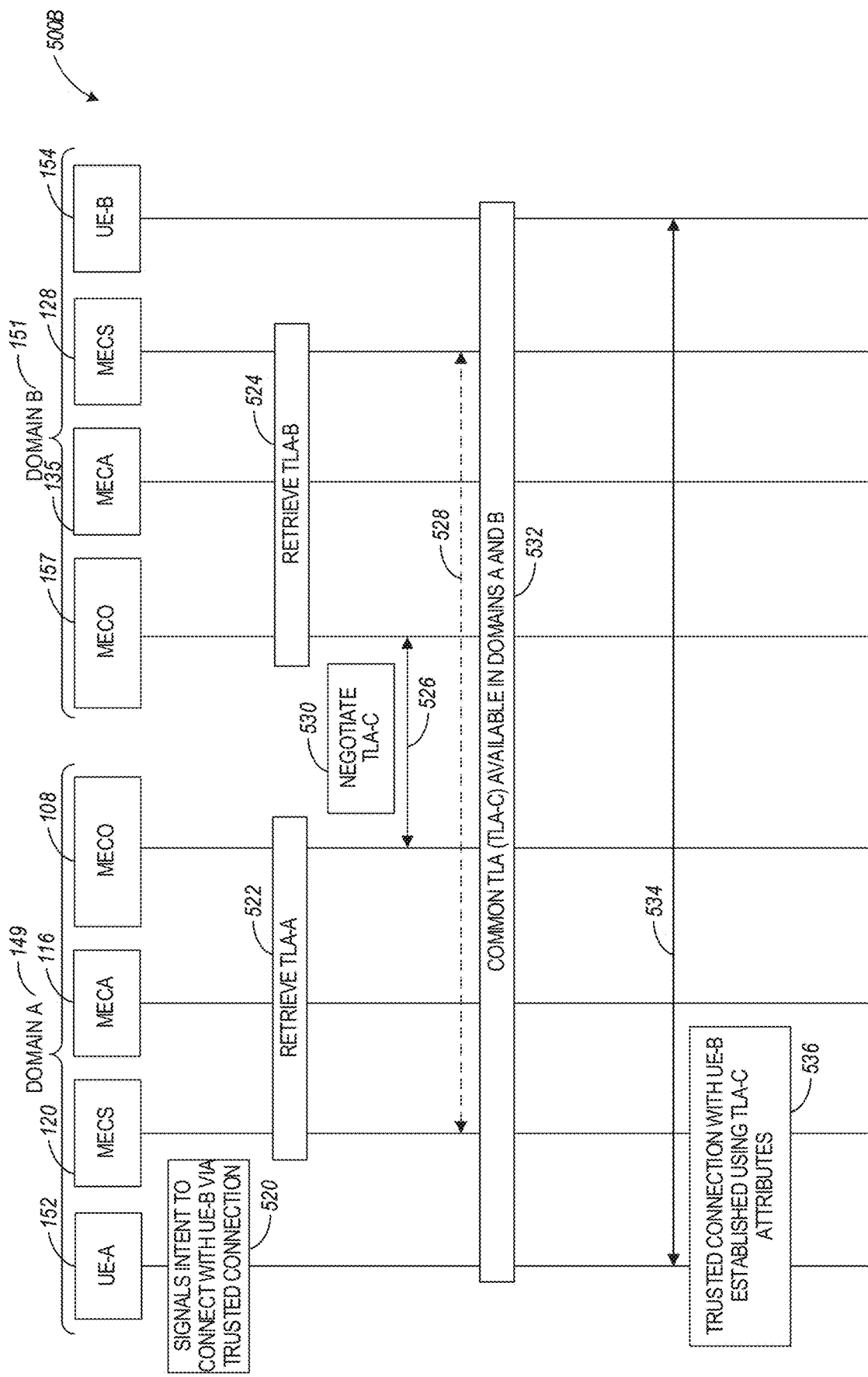
FIG. 5B illustrates a sequence diagram for establishing the domain-to-domain trust in the MEC architecture of FIG. 5A, according to an example.

FIG. 5B illustrates a sequence diagram 500B for establishing the domain-to-domain trust in the MEC architecture of FIG. 5A, according to an example. Referring to FIG. 5B, the communication exchange in sequence diagram 500B can start at operation 520 when the UE 152 in domain 149 signals intent to connect with UE 154 in domain 151 via a trusted connection. At operation 522, the MECO 108 can retrieve TLA 159 (or MECS 120 or MECA 116 can retrieve the TLA for the MECO). Similarly, at operation 524, MECO 157 can retrieve TLA 161 associated with UE 154 and domain 151. At operation 530, orchestrators 108 and 157 can negotiate a common TLA 512 via communication link 526. Alternatively, the negotiation of the common TLA can be performed between the MEC services 120 and 128 via communication link 528. At operation 532, a common TLA 512 is made available for domains 149 and 151. At operation 536, a trusted connection between the UE 152 and UE 154 is established via communication link 534 and using trust attributes from the negotiated common TLA 512.

Figure 6:
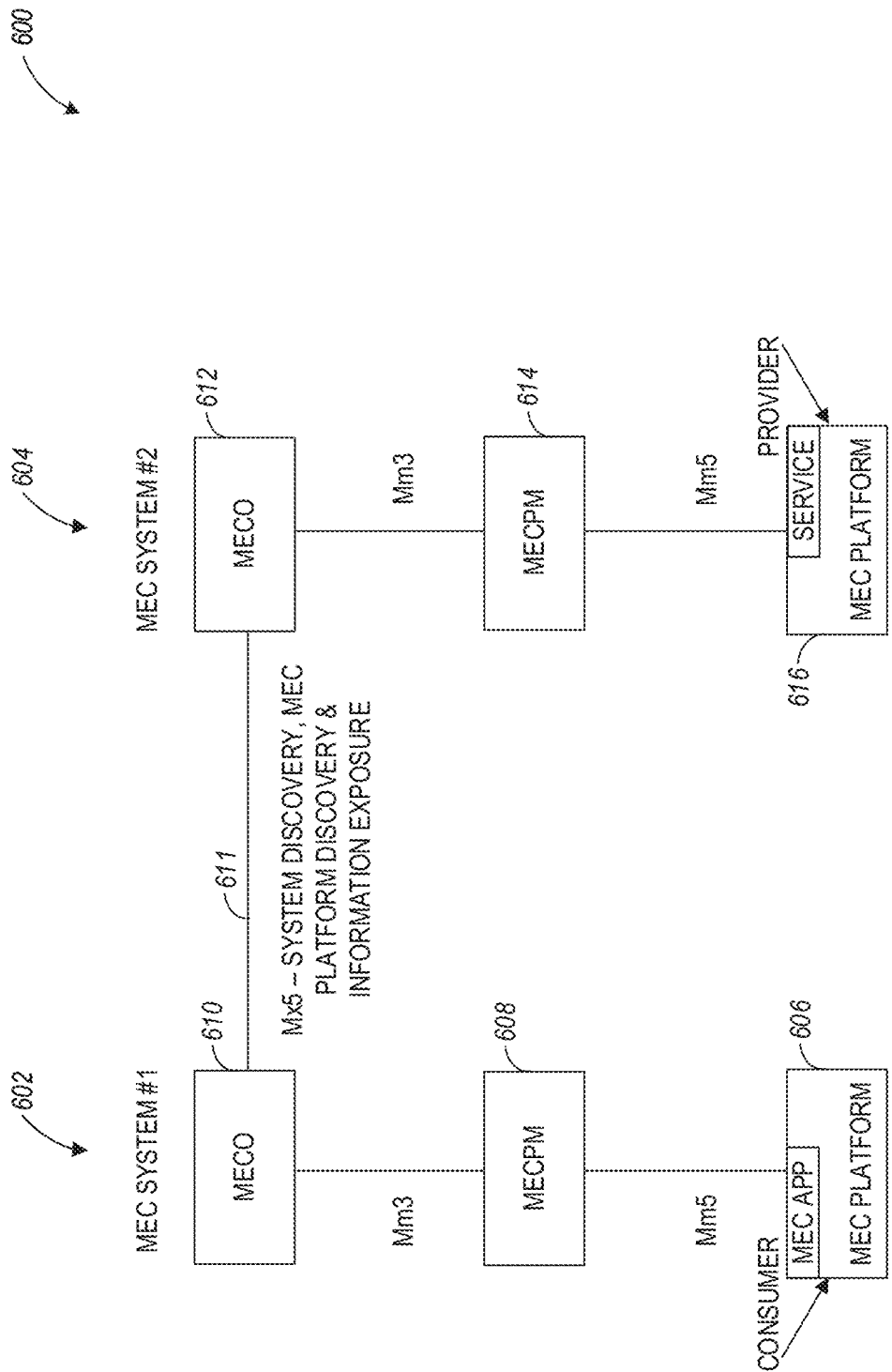
FIG. 6 illustrates a layered approach for inter-MEC system communication binding (IMCB) that may be used for trust establishment, according to an example.

FIG. 6 illustrates a diagram 600 of a layered approach for inter-MEC system communication binding (IMCB) that may be used for trust establishment, according to an example. Referring to FIG. 6, the IMCB can take place between MEC systems 602 and 604. MEC system 602 includes a MEC platform 606 (which can be implemented as part of a MEC host), a MEC platform manager 608, and a MEC orchestrator 610. MEC system 604 includes a MEC platform 606 (which can be implemented as part of a MEC host), a MEC platform manager 614, and a MEC orchestrator 612.

As illustrated in FIG. 6, the MEC platform 616 can be used by a service provider (e.g., an Intelligent Transportation System (ITS) operator or a mobile operator), to provide one or more MEC services, and MEC platform 606 can be used (e.g., by a consumer) to access the services of the provider via MEC application and IMCB connections between multiple MEC entities based on high-level inter-system communication among the MEC orchestrators (MECOs) 610 and 612 for MEC system discovery. The ITS operator, or the mobile operator, deals with different deployed MEC systems to provide a unique ITS service (implemented via the MEC platform 616) in a certain "ITS service area", such as in a country or across the border. Then, it is the operator that defines the set of MEC systems (and their IDs) involved in this "ITS service area". The set of MEC system IDs is communicated to all MECOs (e.g., 610 and 612), e.g., by means of a dedicated interface/reference point 611 (e.g., an Mx5 interface), so that every MEC system 602 and 604 is aware of the set of other systems to communicate with. Such inter-MECO communication may take place periodically, albeit infrequently, depending on the rate of deploying new MEC systems over the "ITS service area".

In some aspects, the dedicated interface between orchestrators 610 and 612 can be used for purposes of conducting a communication exchange and negotiation of a common TLA as discussed hereinabove.

Figure 7A:
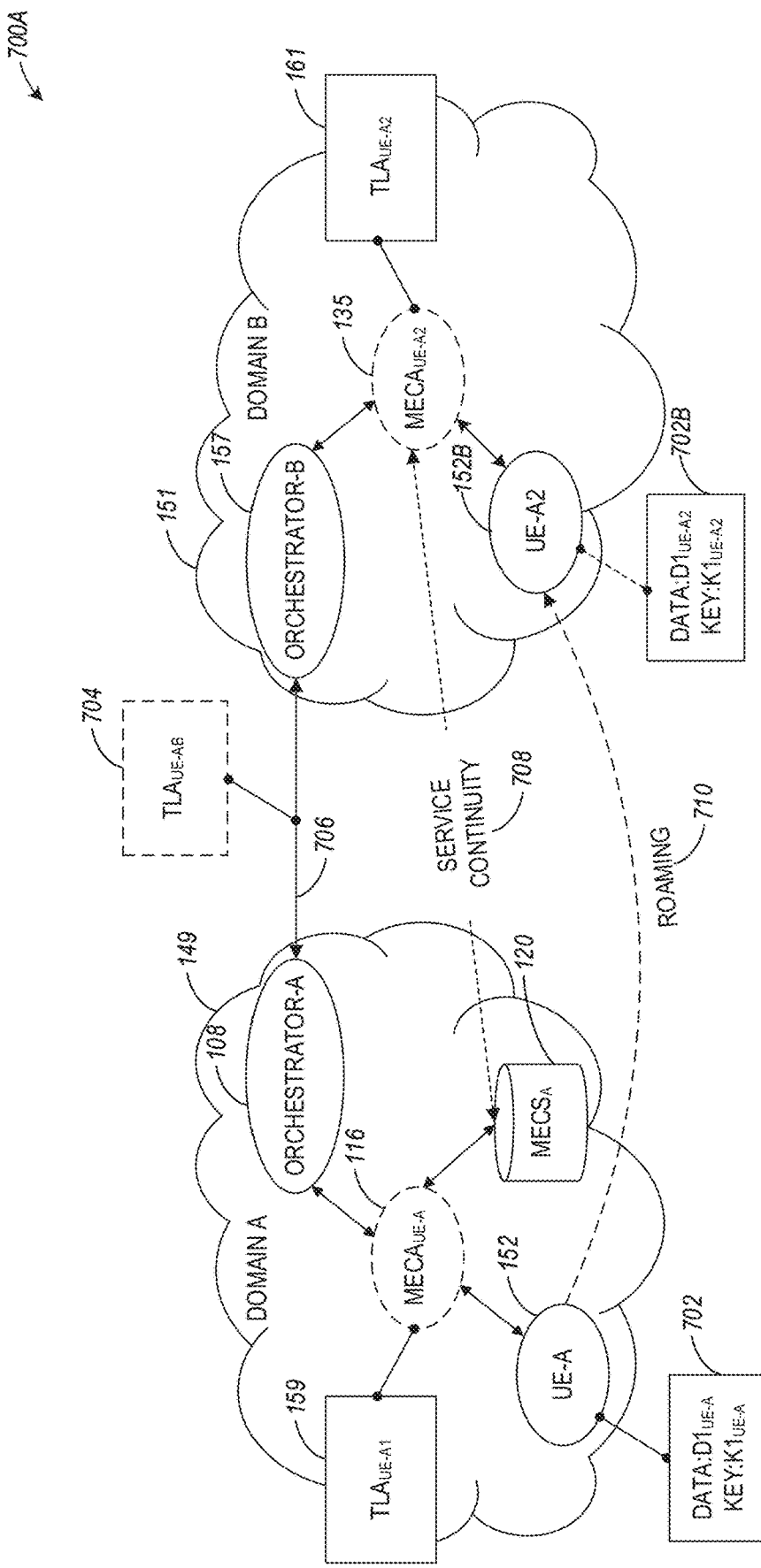
FIG. 7A illustrates communication between a roaming user equipment (UE) and MEC entities in a MEC architecture including different domains based on negotiated domain-to-domain trust, according to an example.

FIG. 7A illustrates communication between a roaming user equipment (UE) and MEC entities in a MEC architecture 700A including different domains based on negotiated domain-to-domain trust, according to an example. Referring to FIG. 7A, the MEC architecture 700A includes MEC entities illustrated in FIG. 1A associated with domain 149 and domain 151. Domain 149 includes UE 152, MECA 116, MECS 120, and MEC Orchestrator (MECO) 108. Domain 151 includes UE 152B (which is the roaming UE 152 within domain 151), MECA 135, and MECO 157. The UE 152 (and 152B after the roaming into the new domain) has data/key package 702 (and 702B after the roaming into the new domain) representing endpoint data and keys used by the UE for trusted communications.

In FIG. 7A, UE 152 intends to roam from domain 149 into domain 151. However, a connection to the existing MECS 120 in domain 149 is preserved subsequent to completing the roaming action (and UE 152 is represented after the roaming 710 is completed as UE 152B in domain 151). A MECA 135 for UE 152B is instantiated in domain 151 and a connection back to MECS$_A$ 120 in domain 149 is created. In this regard, a UE roaming from MEC system A to B is going to consume locally MEC services, even if they belong to different MEC systems (FIG. 7A illustrates the roaming UE 152B consuming services MECS 120 from the UE's original domain 149).

To accomplish this, MECO 108 anticipates UE 152 roaming to domain 151 and opens a connection 706 to MECO 157. The local TLA 159 for domain 149 is supplied to MECO 108, and the local TLA 161 for domain 151 is supplied to MECO 157. In some aspects, the local TLA 161 can be generated when UE 152B is detected within domain 151, and the TLA 161 can be used to establish an initial connection (or pairing) between the UE 152B and MECA 135. MECO 108 and MECO 157 can perform a negotiation via communication links 7062 establish a common TLA 704. The common TLA 704 (or TLA$_{UE-AB}$) can be used to instantiate the MECA$_{UE-A2}$ 135 with the same trust properties as used to establish MECA$_{UE-A}$ 16. When UE 152 is discovered in domain 151 as UE 152B, MECO 157 authorizes the connection between UE 152B and MECA$_{UE-A2}$ 135. The new (common) TLA 704 may be used to re-establish the connection 708 and between UE 152B and MECS 120 (residing in domain 149) via MECA 135 in domain 151. In this regard, service continuity with the same/similar trust properties is ensured even when a UE roams from a first domain to a second domain. Caching of the established common TLA 704 facilitates further interactions between UE 152 and services or applications in domain 151.

Figure 7B:
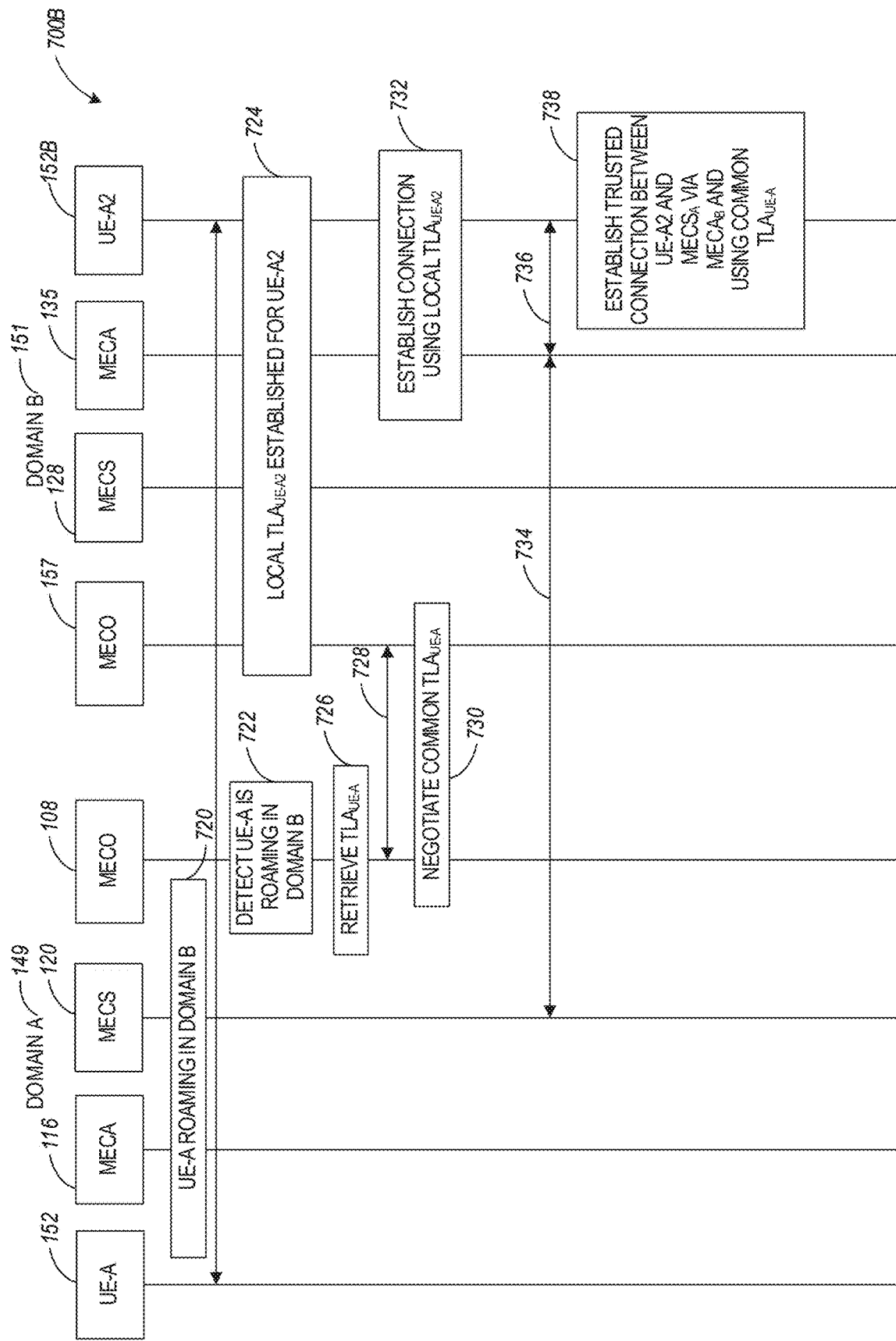
FIG. 7B illustrates a sequence diagram for establishing the domain-to-domain trust in the MEC architecture of FIG. 7A, according to an example.

FIG. 7B illustrates a sequence diagram 700B for establishing the domain-to-domain trust in the MEC architecture of FIG. 7A, according to an example. Referring to FIG. 7B, at operation 720, UE 152 can roam from domain 149 into domain 151 as UE 152B. At operation 722, MECO 108 can detect UE 152 is roaming and is located in domain 151 as a UE 152B. At operation 724, a local TLA 161 can be established in domain 151 upon detecting the presence of UE 152B within the domain. The local TLA 161 can be used for the initial pairing of UE 152B with MECA 135. At operation 726, MECO 108 and retrieve TLA 159 that is local to domain 149. At operation 730, MECO 108 and MECO 157 can perform one or more communication exchanges to negotiate a common TLA 704 via the communication link 728. At operation 732, a connection between MECA 135 and the UE 152B can be established using the local TLA 161. Upon negotiating the common TLA 704, the connection between MECA 135 and UE 152B can be re-established based on trust attributes within the common TLA 704. At operation 738, a trusted connection can be established between UE 152B and MECS 120 in domain 149 via communication links 734 and 736 (using MECA 135) and based on trust attributes within the common TLA 704.

Figure 8A:
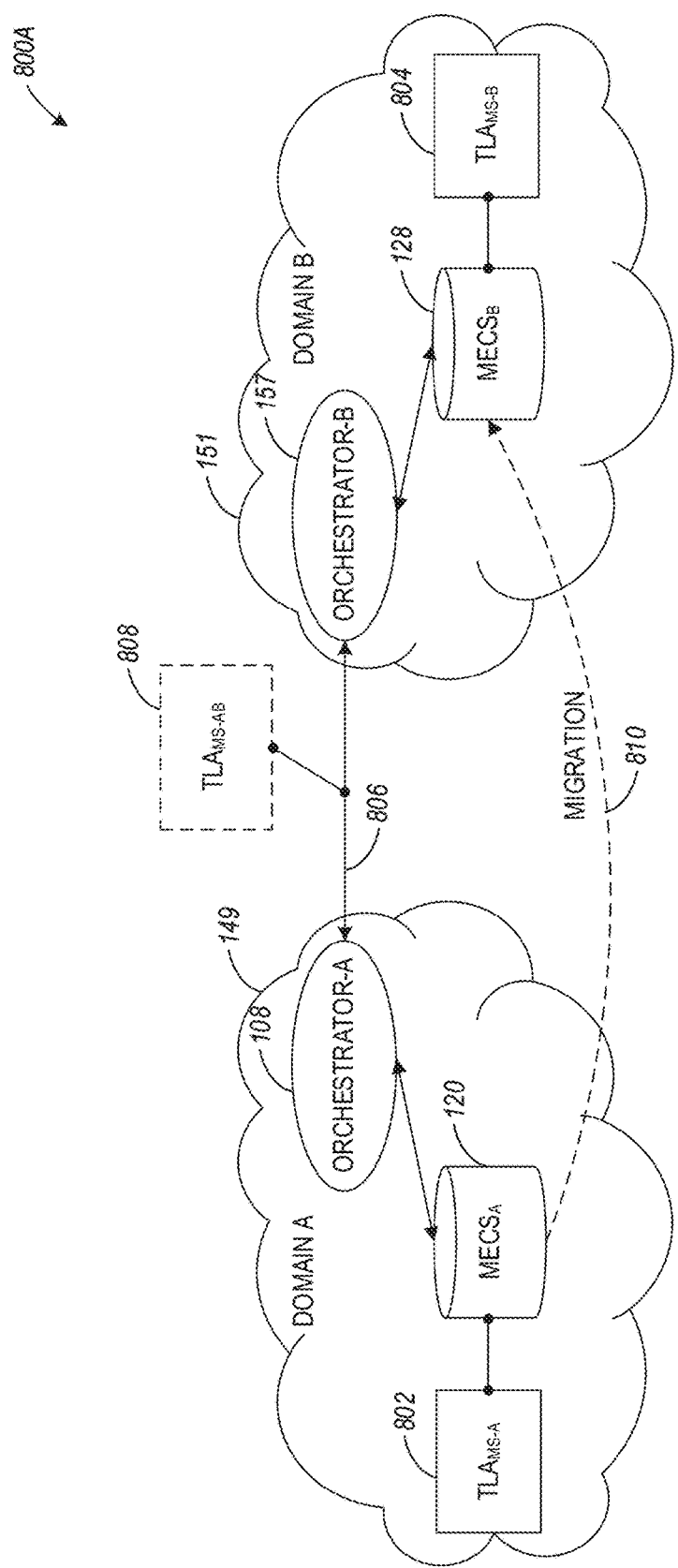
FIG. 8A illustrates migration of a MEC service within a MEC architecture including different domains based on negotiated domain-to-domain trust, according to an example.

FIG. 8A illustrates migration of a MEC service within a MEC architecture 800A including different domains based on negotiated domain-to-domain trust, according to an example. Referring to FIG. 8A, a local TLA 802 can be established within domain 149 for MECS 120, and a local TLA 804 can be established within domain 151 for MECS 128.

In FIG. 8A, MECO 108 wishes to migrate a service MECS 120 to domain 151, indicated by migration path 810. MECO 108 uses TLA$_{MS-A}$ 802 to hold a conversation with MECO 157 via communication link 806 so that a trusted service migration plan is negotiated, resulting in a common TLA$_{MS-AB}$ 808. During the negotiation, MECO 157 may wish to preserve the trust properties found in TLA$_{MS-A}$ or it may wish to alter them. Additionally, MECO 108 may have requirements that must be met otherwise it may not approve the service migration. The common TLA$_{MS-AB}$ 808 includes trust properties and attributes established as part of the negotiation between the MECOs 108 and 157.

Upon completion of the trust negotiation, if successful, MECO 157 instantiates MECS 128 and renames the common TLA$_{MS-AB}$ 808 to TLA$_{MS-B}$ 804 (making it the TLA local to domain 151). The TLA$_{MS-B}$ 804 so renamed, is associated by MECO 157 with metadata identifying TLA$_{MS-A}$ 802 that would permit the migrated service MECS 128 to alter trust properties available to it subsequently in response to changes in TLA$_{MS-A}$ 802 that may happen downstream of this migration.

In some aspects, with distributed ledger-based record keeping, orchestrators across various domains (not even directly connected in a migration graph path), can lean on each other for revoked entities during migration. Additionally, based on the dynamic TLAs determined based on the security attributes of participating UEs at any instant along with appropriate revocation whitelist, MEC orchestrators can perform efficient MEC service resource management (e.g., container orchestration). This allows MEC orchestrators to create virtual sub-domains based on a common gradient of security attributes of all participating entities and associated TLAs.

During the TLA negotiation process, MECO 108 is allowed to find a range of TLA options from 'most acceptable' to 'least acceptable for a given OLA. As part of the negotiation process, MECO 108 can select the most optimal TLA available from MECO 157 for the required service MECS 120. As part of the process, the trust properties are negotiated for the most optimal combination available that meets the OLA requirements and the most optimal negotiated trust requirements. By providing a range of trust options in the TLA (from 'must have' to 'optional') the handshake between the MEC orchestrators can be simplified.

Figure 8B:
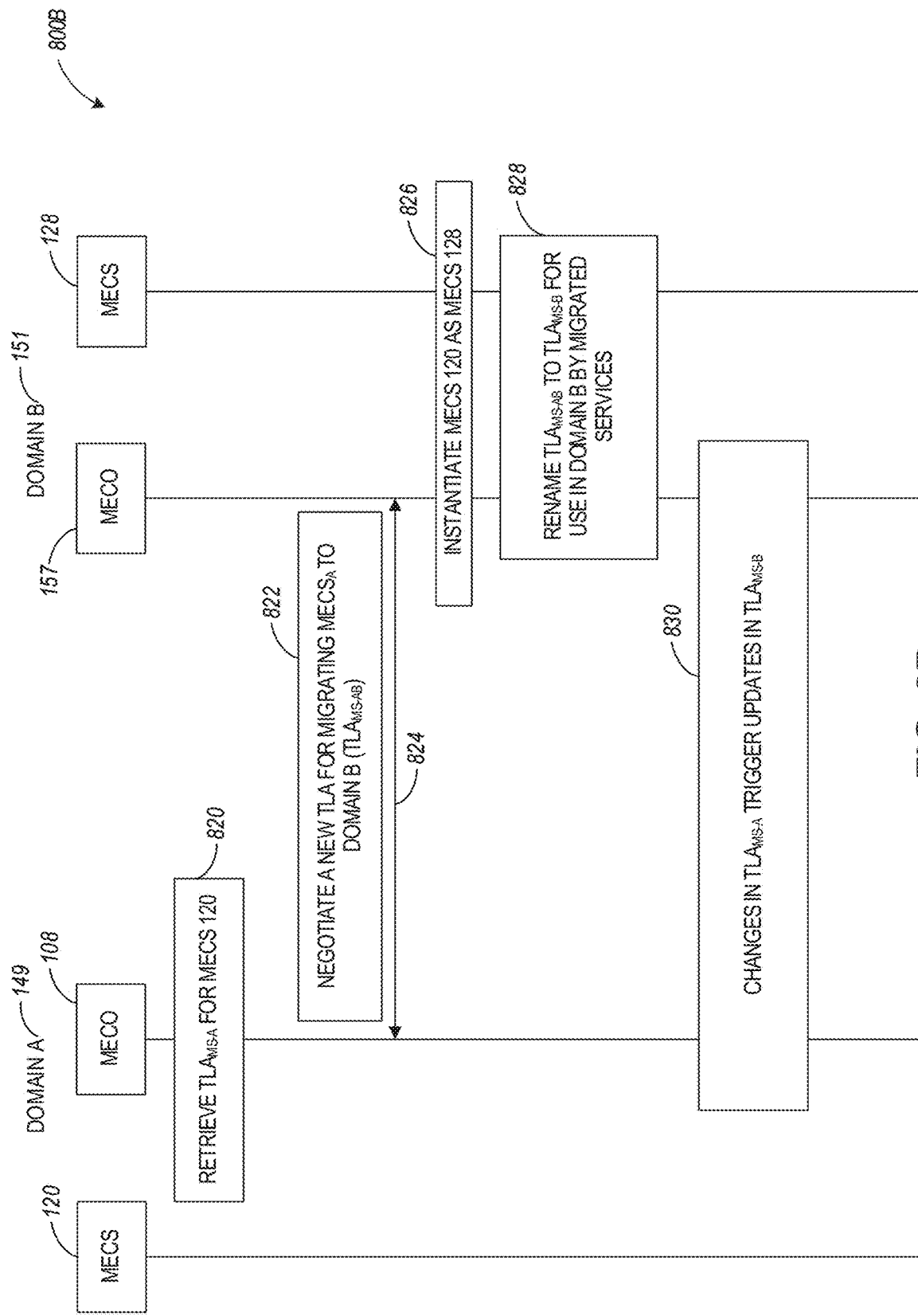
FIG. 8B illustrates a sequence diagram for establishing the domain-to-domain trust in the MEC architecture of FIG. 8A, according to an example.

FIG. 8B illustrates a sequence diagram 800B for establishing the domain-to-domain trust in the MEC architecture of FIG. 8A, according to an example. Referring to FIG. 8B, the illustrated communication exchange can start at operation 820, as one MECO 108 retrieves a local TLA 802 associated with MECS 120 in domain 149. At operation 822, MECO 108 and MECO 157 negotiate (via communication link 824) a new common TLA$_{MS-AB}$ 808 for purposes of migrating MECS 122 domain 151 as MECS 128. After the negotiation is completed, MECS 120 is instantiated as MECS 128 within domain 151. At operation 828, the common TLA$_{MS-AB}$ 808 can be renamed to TLA$_{MS-B}$ for acting as the TLA 804 that is local to domain 151. At operation 838, any subsequent modifications to TLA 802 in domain 149 that relate to the migrated service can be communicated via the orchestrators 108 and 157 and appropriate corrections can be made within the common TLA used within domain 151.

Figure 9:
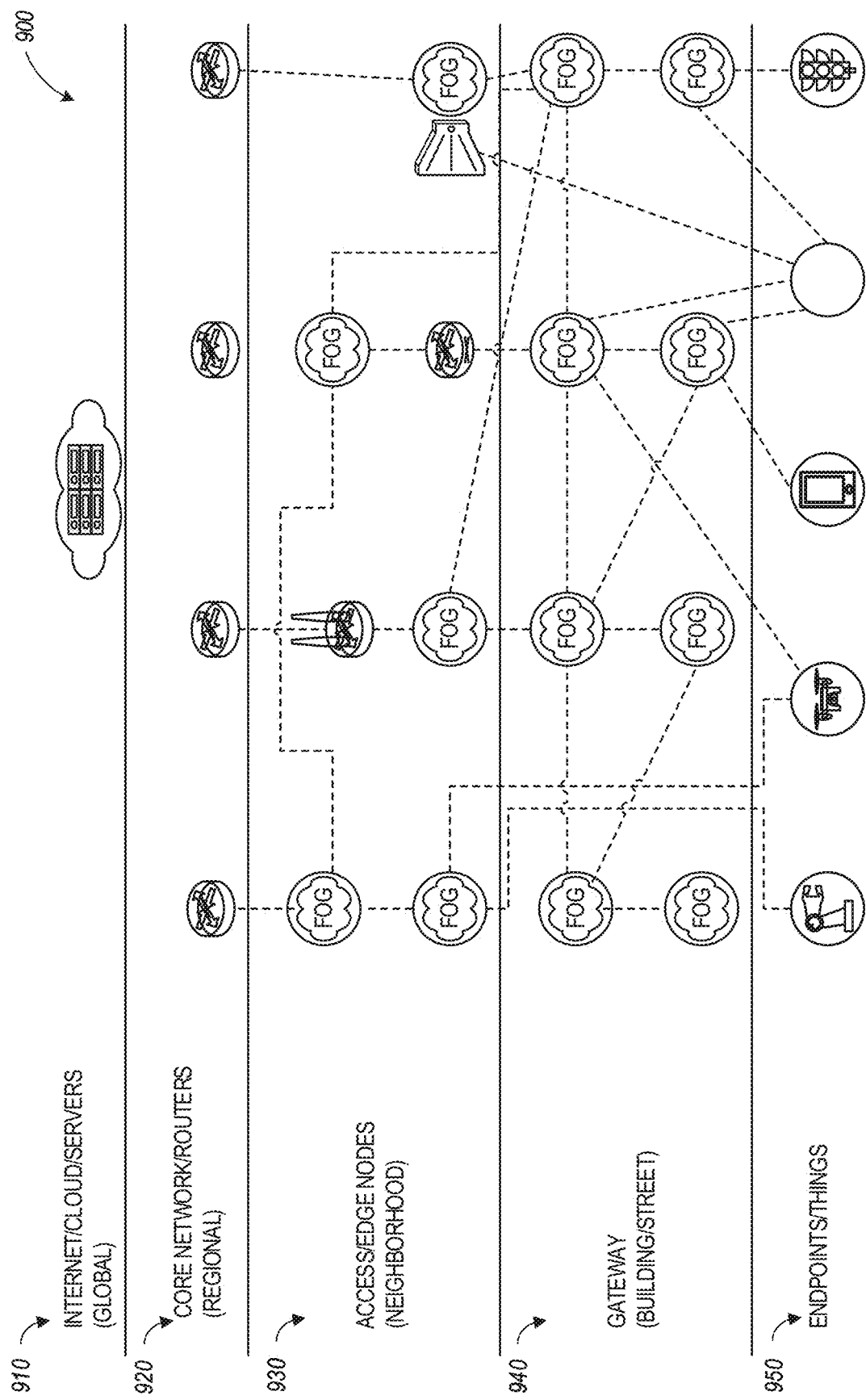
FIG. 9 illustrates a MEC and FOG network topology, according to an example.

FIG. 9 illustrates a MEC and FOG network topology 900, according to an example. Referring to FIG. 9, the network topology 900 can include a number of conventional networking layers, that can be extended through the use of multi-domain trust establishment using TLAs as discussed herein. Specifically, the relationships between endpoints (at endpoints/things network layer 950), gateways (at gateway layer 940), access or edge computing nodes (e.g., at neighborhood nodes layer 930), core network or routers (e.g., at regional or central office layer 920), may be represented through the use of data communicated via MEC hosts that use TLAs that can be located at various nodes within the topology 900.

A FOG network (e.g., established at gateway layer 940) may represent a dense geographical distribution of near-user edge devices (e.g., FOG nodes), equipped with storage capabilities (e.g., to avoid the need to store data in cloud data centers), communication capabilities (e.g., rather than routed over the internet backbone), control capabilities, configuration capabilities, measurement and management capabilities (rather than controlled primarily by network gateways such as those in the LTE core network), among others. In this context, FIG. 9 illustrates a general architecture that integrates a number of MEC and FOG nodes-categorized in different layers (based on their position, connectivity and processing capabilities, etc.), with each node implementing a MEC API that can enable a MEC app or other entity of a MEC enabled node to communicate with other nodes. It will be understood, however, that such FOG nodes may be replaced or augmented by edge computing processing nodes.

FOG nodes may be categorized depending on the topology and the layer where they are located. In contrast, from a MEC standard perspective, each FOG node may be considered as a MEC host, or a simple entity hosting a MEC app and a light-weighted MEC platform.

In an example, a MEC or FOG node may be defined as an application instance, connected to or running on a device (MEC host) that is hosting a MEC platform. Here, the application consumes MEC services and is associated with a MEC host in the system. The nodes may be migrated, associated with different MEC hosts, or consume MEC services from other (e.g., local or remote) MEC platforms.

In contrast to this approach, traditional V2V applications are reliant on remote cloud data storage and processing to exchange and coordinate information. A cloud data arrangement allows for long-term data collection and storage but is not optimal for highly time-varying data, such as a collision, traffic light change, etc. and may fail in attempting to meet latency challenges, such as stopping a vehicle when a child runs into the street.

In some aspects, the MEC or FOG facilities can be used to locally create, maintain, and destroy MEC or FOG nodes to host data exchanged via NFVs and using resources managed by a MEC QoS manager, based upon need. Depending on the real-time requirements in a vehicular communications context, a hierarchical structure of data processing and storage nodes can be defined. For example, including local ultra-low-latency processing, regional storage, and processing as well as remote cloud data-center based storage and processing. Key Performance Indicators (KPs) may be used to identify where sensor data is best transferred and where it is processed or stored. This typically depends on the ISO layer dependency of the data. For example, the lower layer (PHY, MAC, routing, etc.) data typically changes quickly and is better handled locally in order to meet latency requirements. Higher layer data such as Application Layer data is typically less time critical and may be stored and processed in a remote cloud data-center. In some aspects, the KPIs are metrics or operational parameters that can include spatial proximity to a V2X-related target event (e.g., accident, etc.); physical proximity to other objects (e.g., how much time is required to transfer data from one data or application object to another object); available processing power; or current load of the target (network) node and corresponding processing latency. In some aspects, the KPIs can be used to facilitate automated location and relocation of data in a MEC architecture.

Figure 10:
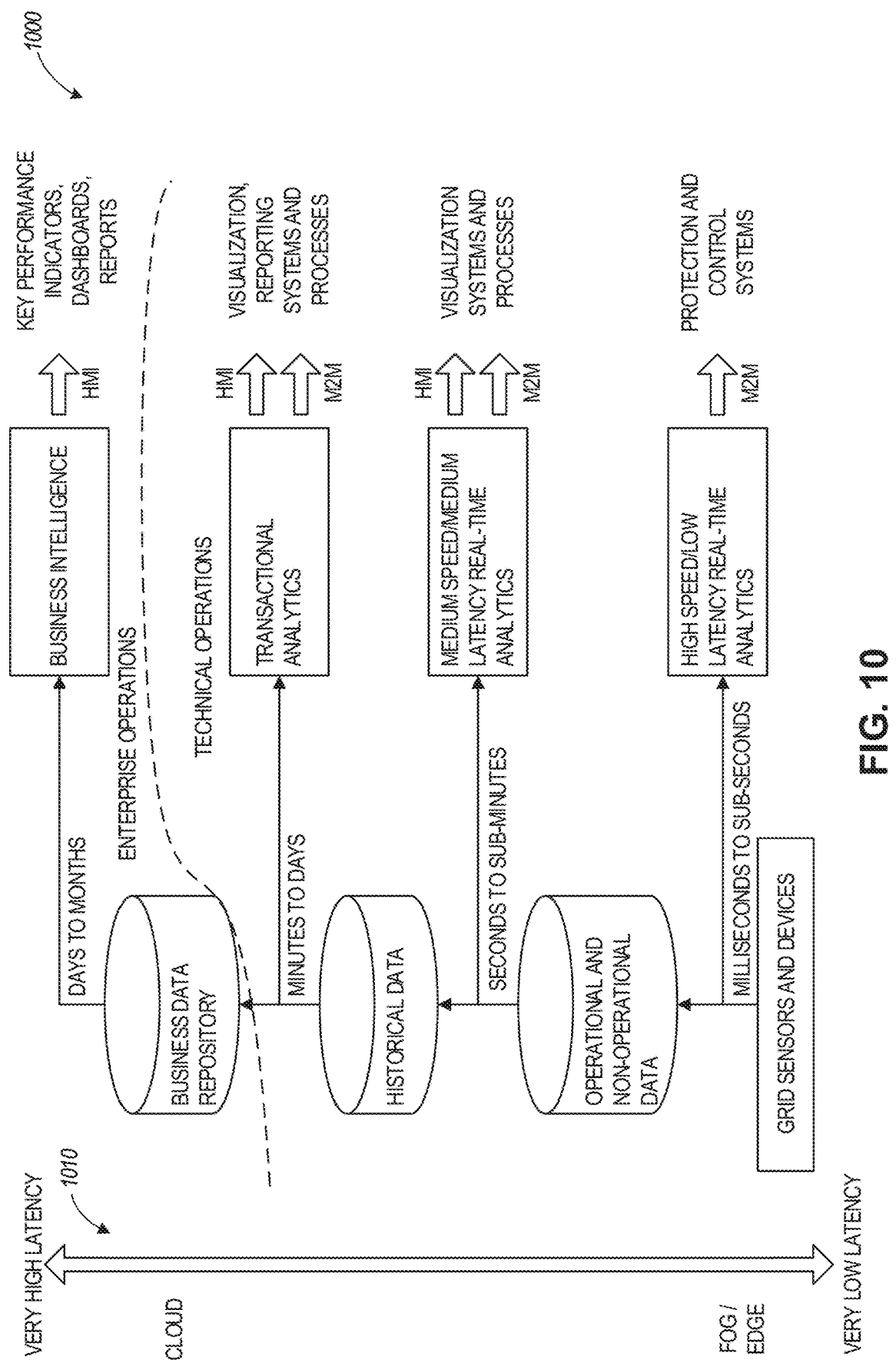
FIG. 10 illustrates the processing and storage layers in a MEC and FOG network, according to an example.

FIG. 10 illustrates the processing and storage layers in a MEC and FOG network 1000, according to an example. The illustrated data storage or processing hierarchy 1010 relative to the cloud and fog/edge networks allows dynamic reconfiguration of elements to meet latency and data processing parameters.

The lowest hierarchy level is on a vehicle-level. This level stores data on past observations or data obtained from other vehicles. The second hierarchy level is distributed storage across a number of vehicles. This distributed storage may change on short notice depending on vehicle proximity to each other or a target location (e.g., near an accident). The third hierarchy level is in a local anchor point, such as a MEC component, carried by a vehicle in order to coordinate vehicles in a pool of cars. The fourth level of the hierarchy is storage shared across MEC components. For example, data is shared between distinct pools of vehicles that are in the range of each other.

The fifth level of the hierarchy is fixed infrastructure storage, such as in road side units (RSUs). This level may aggregate data from entities in hierarchy levels 1-4. The sixth level of the hierarchy is storage across the fixed infrastructure. This level may, for example, be located in the Core Network of a telecommunications network, or an enterprise cloud. Other types of layers and layer processing may follow from this example.

Figure 11:
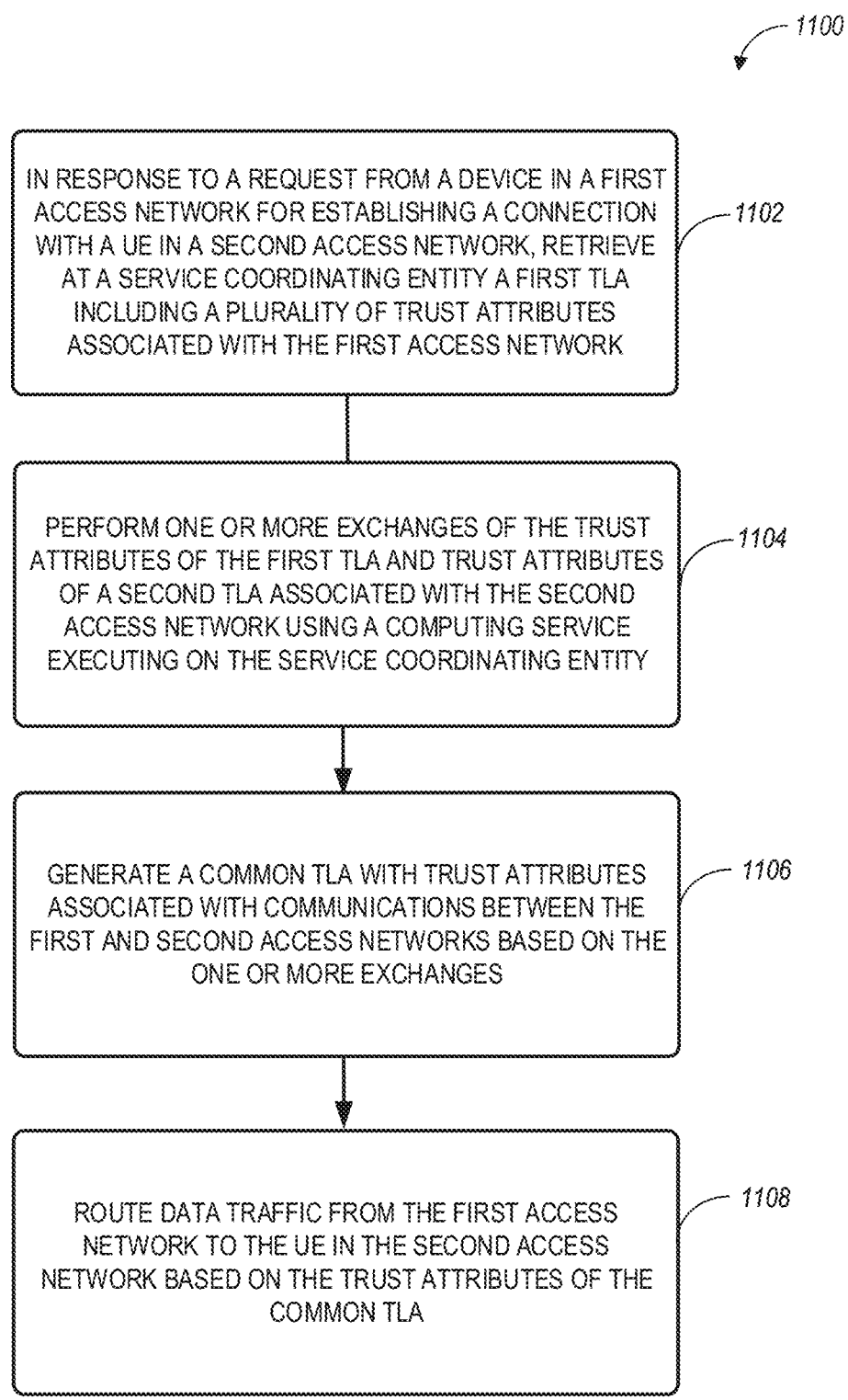
FIG. 11 illustrates a flowchart of a method for multi-domain trust establishment in MEC architectures, according to an example.

FIG. 11 illustrates a flowchart of a method 1100 for multi-domain trust establishment in MEC architectures, according to an example. The method 1100 includes operations 1102, 1104, 1106, and 1108. By way of example and not limitation, the method 1100 is described as being performed by the MEC host 402 or 102 (which can be the same as Edge/IoT processing device 1550 of FIG. 15). At operation 1102, in response to a request for establishing a connection with a user equipment (UE) (e.g., UE 154) in a second access network of the plurality of access networks, a first Trusted Level Agreement (TLA) is retrieved that includes a plurality of trust attributes associated with the first access network. For example, MECO 108 retrieves TLA 159 associated with UE 152 and is local to domain 149. At operation 1104, one or more exchanges of the trust attributes of the first TLA and trust attributes of a second TLA associated with the second access network are performed using a computing service executing on the service coordinating entity. For example, and as illustrated in FIGS. 5A-5B, a trusted exchange 510 is performed between MEC services 120 and 128 to negotiate a common TLA 512. At operation 1106, a common TLA (e.g., 512) is generated with trust attributes associated with communications between the first and second access networks based on the one or more exchanges. At operation 1108, data traffic is routed from the first access network (e.g., from UE 152 in domain 149) to the UE in the second access network (e.g., UE 154 in domain 151) based on the trust attributes of the common TLA (e.g., the trust attributes within the negotiated common TLA 512).

Even though trust establishment techniques disclosed herein are discussed in connection with MEC-related architectures where at least one MEC entity is present, the disclosure is not limited in this regard and the disclosed techniques may be used in architectures that do not use MEC entities.

Even though techniques disclosed herein are described in connection with a MEC architecture and 5G architecture, the disclosure is not limited in this regard and the disclosed techniques can be used with other types of wireless architectures (e.g., 2G, 3G, 4G, etc.) that use one or more MEC entities.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System)(W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), etc.

Aspects described herein can be used in the context of any spectrum management scheme including a dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (e.g., having near-global designation for Multi-Gigabit Wireless Systems (MGWS)/WiGig; in US (FCC part 15) allocated as total 14 GHz spectrum, while EU (ETSI EN 302 567 and ETSI EN 301 217-2 for fixed P2P) allocated as total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz), where particularly the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme by, e.g., introducing a hierarchical prioritization of usage for different types of users (e.g., low/medium/high priority, etc.), based on a prioritized access to the spectrum e.g. with the highest priority to tier-1 users, followed by tier-2, then tier-3 users, and so forth.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources. Some of the features in this document are defined for the network side, such as Access Points, eNodeBs, New Radio (NR) or next generation Node-Bs (gNodeB or gNB), such as used in the context of 3GPP fifth generation (5G) communication systems, etc. Still, a User Equipment (UE) may take this role as well and act as an Access Points, eNodeBs, gNodeBs, etc. Accordingly, some or all features defined for network equipment may be implemented by a UE or a mobile computing device.

In further examples, the preceding examples of network communications and operations may be integrated with IoT and like device-based network architectures. FIG. 10 illustrates an example domain topology for respective IoT networks coupled through links to respective gateways. The IoT is a concept in which a large number of computing devices are interconnected to each other and to the Internet to provide functionality and data acquisition at very low levels. Thus, as used herein, an Edge/IoT processing device may include a semi-autonomous device performing a function, such as sensing or control, among others, in communication with other Edge/IoT processing devices and a wider network, such as the Internet.

MEC use cases have been envisioned to integrate into a number of network and application settings, including those to support network arrangements of IoT deployments. Edge/IoT processing devices are physical or virtualized objects that may communicate on a network (typically at the edge or endpoint of a network) and may include sensors, actuators, and other input/output components, such as to collect data or perform actions from a real-world environment. For example, Edge/IoT processing devices may include low-powered devices that are embedded or attached to everyday things, such as buildings, vehicles, packages, etc., to provide sensing, data, or processing functionality. Recently, Edge/IoT processing devices have become more popular and thus applications and use cases using these devices have proliferated.

Various standards have been proposed to more effectively interconnect and operate Edge/IoT processing devices and IoT network use cases, including those with MEC and mobile network architectures. Some of the relevant communication and network architecture standards include those distributed by groups such as ETSI, 3rd Generation Partnership Project (3GPP), Institute of Electrical and Electronics Engineers (IEEE), in addition to specialized IoT application interaction architecture and configuration standards distributed by working groups such as the Open Connectivity Foundation (OCF).

Often, Edge/IoT processing devices are limited in memory, size, or functionality, enabling larger numbers to be deployed for a similar cost to smaller numbers of larger devices. However, an Edge/IoT processing device may be a smartphone, laptop, tablet, PC, or other larger device. Further, an Edge/IoT processing device may be a virtual device, such as an application on a smartphone or another computing device. Edge/IoT processing devices may include IoT gateways, used to couple Edge/IoT processing devices to other Edge/IoT processing devices and to cloud applications, for data storage, process control, and the like.

Networks of Edge/IoT processing devices may include commercial and home automation devices, such as water distribution systems, electric power distribution systems, pipeline control systems, plant control systems, light switches, thermostats, locks, cameras, alarms, motion sensors, and the like. The Edge/IoT processing devices may be accessible through remote computers, servers, and other systems, for example, to control systems or access data.

The future growth of the Internet and like networks may involve very large numbers of Edge/IoT processing devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of Edge/IoT processing devices and networks present a number of new challenges in a heterogeneous network of connectivity comprising a combination of wired and wireless technologies.

Figure 12:
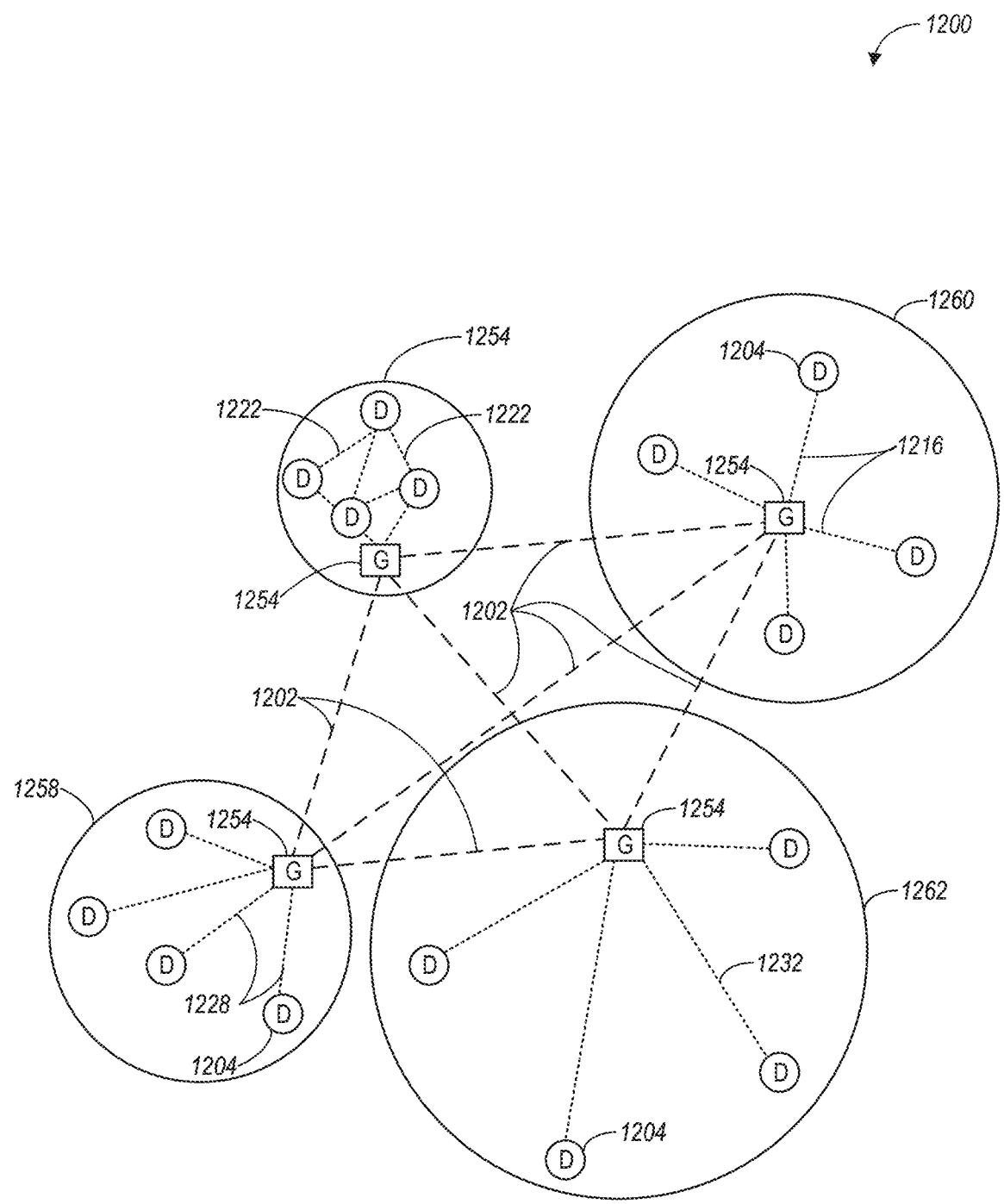
FIG. 12 illustrates a domain topology for respective internet-of-things (IoT) networks coupled through links to respective gateways, according to an example.

FIG. 12 specifically provides a simplified drawing of a domain topology that may be used for a number of IoT networks comprising Edge/IoT processing devices 1204, with the IoT networks 1256, 1258, 1260, 1262, coupled through backbone links 1202 to respective gateways 1254. For example, a number of Edge/IoT processing devices 1204 may communicate with a gateway 1254, and with each other through the gateway 1254. To simplify the drawing, not every Edge/IoT processing device 1204, or communications link (e.g., link 1216, 1222, 1228, or 1232) is labeled. The backbone links 1202 may include any number of wired or wireless technologies, including optical networks, and may be part of a local area network (LAN), a wide area network (WAN), or the Internet. Additionally, such communication links facilitate optical signal paths among both Edge/IoT processing devices 1204 and gateways 1254, including the use of MUXing/deMUXing components that facilitate interconnection of the various devices.

The network topology may include any number of types of IoT networks, such as a mesh network provided with the network 1256 using Bluetooth low energy (BLE) links 1222. Other types of IoT networks that may be present include a wireless local area network (WLAN) network 1258 used to communicate with Edge/IoT processing devices 1204 through IEEE 802.11 (Wi-Fi®) links 1228, a cellular network 1260 used to communicate with Edge/IoT processing devices 1204 through an LTE/LTE-A (4G) or 5G cellular network, and a low-power wide area (LPWA) network 1262, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with the use of a variety of network and internet application protocols such as Constrained Application Protocol (CoAP). The respective IoT networks may also be integrated with coordinator devices that provide a chain of links that form the cluster tree of linked devices and networks.

Each of these IoT networks may provide opportunities for new technical features, such as those as described herein. The improved technologies and networks may enable the exponential growth of devices and networks, including the use of IoT networks into fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between Edge/IoT processing devices 1204, such as over the backbone links 1202, may be protected by a decentralized system for authentication, authorization, and accounting (AAA). In a decentralized AAA system, distributed payment, credit, audit, authorization, and authentication systems may be implemented across the interconnected heterogeneous network infrastructure. This enables systems and networks to move towards autonomous operations. In these types of autonomous operations, machines may even contract for human resources and negotiate partnerships with other machine networks. This may enable the achievement of mutual objectives and balanced service delivery against outlined, planned service level agreements as well as achieve solutions that provide metering, measurements, traceability, and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the Edge/IoT processing devices. The integration of sensory systems may enable systematic and autonomous communication and coordination of service delivery against contractual service objectives, orchestration and QoS-based swarming and fusion of resources. Some of the individual examples of network-based resource processing include the following.

The mesh network 1256, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource-based trust and service indices may be inserted to improve the data integrity, quality, assurance and deliver a metric of data confidence.

The WLAN network 1258, for instance, may use systems that perform standards conversion to provide multi-standard connectivity, enabling Edge/IoT processing devices 1204 using different protocols to communicate. Further systems may provide seamless interconnectivity across a multi-standard infrastructure comprising visible Internet resources and hidden Internet resources.

Communications in the cellular network 1260, for instance, may be enhanced by systems that offload data, extend communications to more remote devices, or both. The LPWA network 1262 may include systems that perform non-Internet protocol (IP) to IP interconnections, addressing, and routing. Further, each of the Edge/IoT processing devices 1204 may include the appropriate transceiver for wide area communications with that device. Further, each Edge/IoT processing device 1204 may include other transceivers for communications using additional protocols and frequencies. This is discussed further with respect to the communication environment and hardware of an IoT processing device depicted in FIG. 14 and FIG. 15.

Finally, clusters of Edge/IoT processing devices may be equipped to communicate with other Edge/IoT processing devices as well as with a cloud network. This may enable the Edge/IoT processing devices to form an ad-hoc network between the devices, enabling them to function as a single device, which may be termed a fog device, fog platform, or fog network. This configuration is discussed further with respect to FIG. 13 below.

Figure 13:
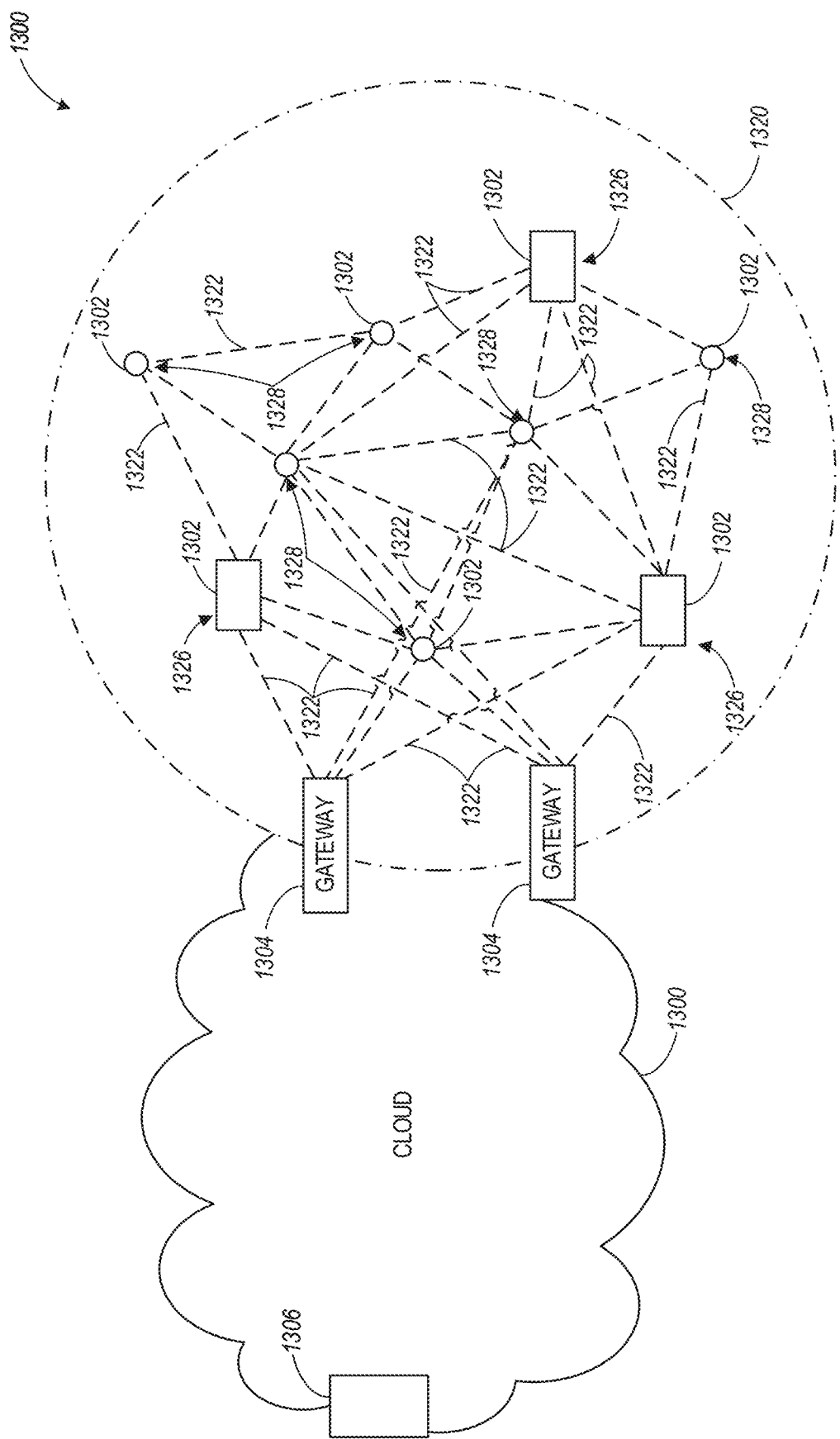
FIG. 13 illustrates a cloud-computing network in communication with a mesh network of Edge/IoT processing devices operating as fog devices at the edge of the cloud computing network, according to an example.

FIG. 13 illustrates a cloud-computing network in communication with a mesh network of Edge/IoT processing devices (devices 1302) operating as fog devices at the edge of the cloud computing network, according to an example. The mesh network of Edge/IoT processing devices may be termed a fog network 1320, established from a network of devices operating at the edge of the cloud 1300. To simplify the diagram, not every Edge/IoT processing device 1302 is labeled.

The fog network 1320 may be considered to be a massively interconnected network wherein a number of Edge/IoT processing devices 1302 are in communications with each other, for example, by radio links 1322. The fog network 1320 may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another.

As an example, the fog network 1320 may be facilitated using an interconnect specification released by the Open Connectivity Foundation™ (OCF). This standard enables devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of Edge/IoT processing devices 1302 are shown in this example, gateways 1304, data aggregators 1326, and sensors 1328, although any combinations of Edge/IoT processing devices 1302 and functionality may be used. The gateways 1304 may be edge devices that provide communications between the cloud 1300 and the fog 1320 and may also provide the backend process function for data obtained from sensors 1328, such as motion data, flow data, temperature data, and the like. The data aggregators 1326 may collect data from any number of the sensors 1328 and perform the back-end processing function for the analysis. The results, raw data, or both may be passed along to the cloud 1300 through the gateways 1304. The sensors 1328 may be full Edge/IoT processing devices 1302, for example, capable of both collecting data and processing the data. In some cases, the sensors 1328 may be more limited in functionality, for example, collecting the data and enabling the data aggregators 1326 or gateways 1304 to process the data.

Communications from any of the Edge/IoT processing devices 1302 may be passed along a convenient path (e.g., a most convenient path) between any of the Edge/IoT processing devices 1302 to reach the gateways 1304. In these networks, the number of interconnections provides substantial redundancy, enabling communications to be maintained, even with the loss of a number of Edge/IoT processing devices 1302. Further, the use of a mesh network may enable Edge/IoT processing devices 1302 that are very low power or located at a distance from infrastructure to be used, as the range to connect to another Edge/IoT processing devices 1302 may be much less than the range to connect to the gateways 1304.

The fog 1320 provided from these Edge/IoT processing devices 1302 may be presented to devices in the cloud 1300, such as a server 1306, as a single device located at the edge of the cloud 1300, e.g., a fog device. In this example, the alerts coming from the Fog device may be sent without being identified as coming from a specific Edge/IoT processing devices 1302 within the fog 1320. In this fashion, the fog 1320 may be considered a distributed platform that provides computing and storage resources to perform processing or data-intensive tasks such as data analytics, data aggregation, and machine learning, among others.

In some examples, the Edge/IoT processing devices 1302 may be configured using an imperative programming style, e.g., with each Edge/IoT processing devices 1302 having a specific function and communication partners. However, the Edge/IoT processing devices 1302 forming the fog device may be configured in a declarative programming style, enabling the Edge/IoT processing devices 1302 to reconfigure their operations and communications, such as to determine needed resources in response to conditions, queries, and device failures. As an example, a query from a user located at a server 1306 about the operations of a subset of equipment monitored by the Edge/IoT processing devices 1302 may result in the fog 1320 device selecting the Edge/IoT processing devices 1302, such as particular sensors 1328, needed to answer the query. The data from these sensors 1328 may then be aggregated and analyzed by any combination of the sensors 1328, data aggregators 1326, or gateways 1304, before being sent on by the fog 1320 device to the server 1306 to answer the query. In this example, Edge/IoT processing devices 1302 in the fog 1320 may select the sensors 1328 used based on the query, such as adding data from flow sensors or temperature sensors. Further, if some of the Edge/IoT processing devices 1302 are not operational, other Edge/IoT processing devices 1302 in the fog 1320 device may provide analogous data, if available.

In other examples, the operations and functionality described above may be embodied by an Edge/IoT processing device machine in the example form of an electronic processing system, within which a set or sequence of instructions may be executed to cause the electronic processing system to perform any one of the methodologies discussed herein, according to an example embodiment. The machine may be an Edge/IoT processing device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, these and like examples to a processor-based system shall be taken to include any set of one or more machines that are controlled by or operated by a processor, set of processors, or processing circuitry (e.g., a machine in the form of a computer, UE, MEC processing device, IoT processing device, etc.) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 14:
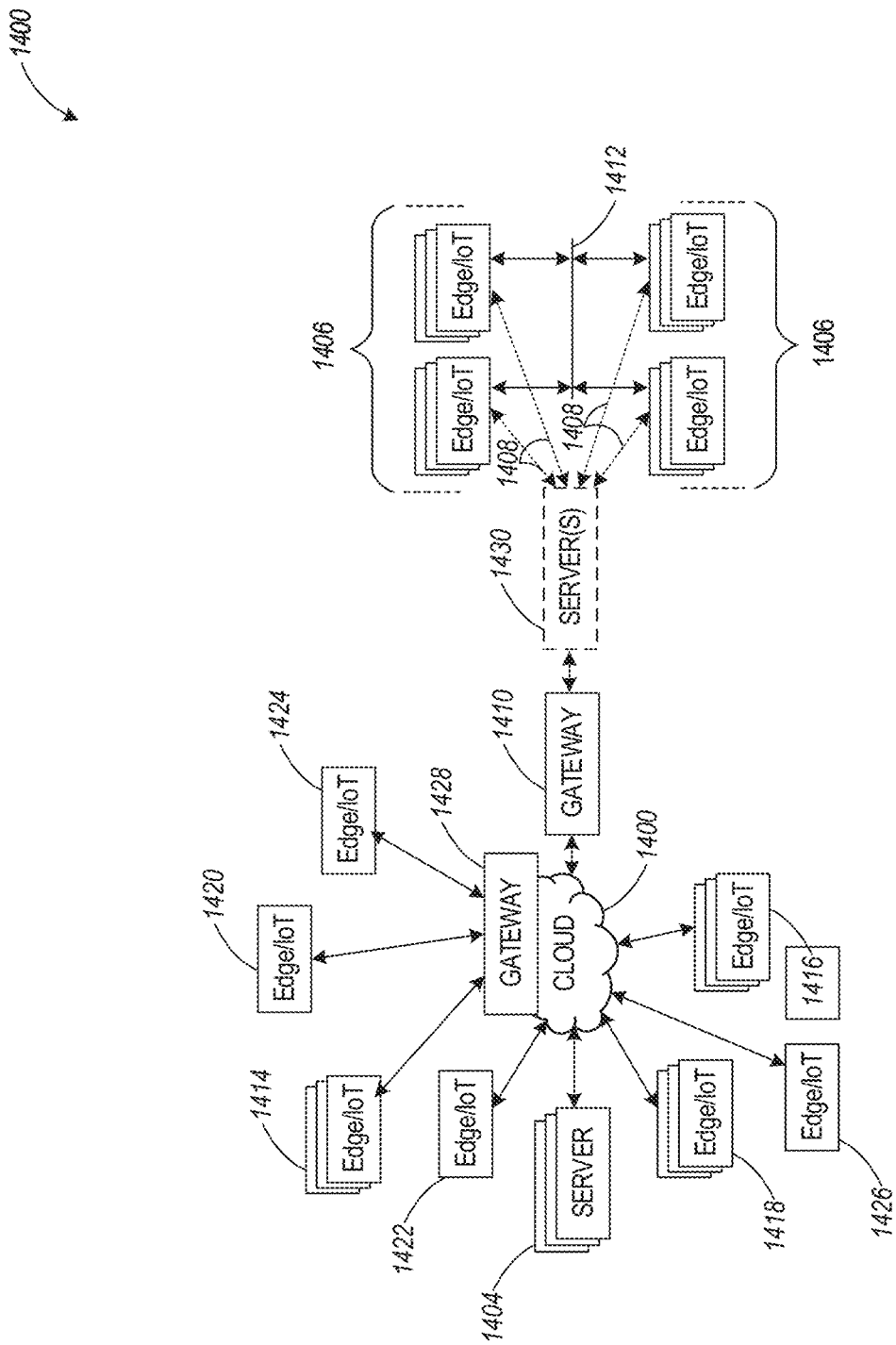
FIG. 14 illustrates a block diagram of a cloud computing network in communication with a number of Edge/IoT processing devices, according to an example.

FIG. 14 illustrates a block diagram of a cloud computing network, or cloud 1400, in communication with a number of Edge/IoT processing devices, according to an example. The cloud computing network (or "cloud") 1400 may represent the Internet or may be a local area network (LAN), or a wide area network (WAN), such as a proprietary network for a company. The Edge/IoT processing devices may include any number of different types of devices, grouped in various combinations. For example, a traffic control group 1406 may include Edge/IoT processing devices along streets in a city. These Edge/IoT processing devices may include stoplights, traffic flow monitors, cameras, weather sensors, and the like. The traffic control group 1406, or other subgroups, may be in communication with the cloud 1400 through wired or wireless links 1408, such as LPWA links, optical links, and the like. Further, a wired or wireless sub-network 1412 may allow the Edge/IoT processing devices to communicate with each other, such as through a local area network, a wireless local area network, and the like. The Edge/IoT processing devices may use another device, such as a gateway 1410 or 1428 to communicate with remote locations such as the cloud 1400; the Edge/IoT processing devices may also use one or more servers 1430 to facilitate communication with the cloud 1400 or with the gateway 1410. For example, the one or more servers 1430 may operate as an intermediate network node to support a local edge cloud or fog implementation among a local area network. Further, the gateway 1428 that is depicted may operate in a cloud-to-gateway-to-many edge devices configuration, such as with the various Edge/IoT processing devices 1414, 1420, 1424 being constrained or dynamic to an assignment and use of resources in the cloud 1400.

Other example groups of Edge/IoT processing devices may include remote weather stations 1414, local information terminals 1416, alarm systems 1418, automated teller machines 1420, alarm panels 1422, or moving vehicles, such as emergency vehicles 1424 or other vehicles 1426, among many others. Each of these Edge/IoT processing devices may be in communication with other Edge/IoT processing devices, with servers 1404, with another IoT fog platform or system, or a combination therein. The groups of Edge/IoT processing devices may be deployed in various residential, commercial, and industrial settings (including in both private or public environments).

As may be seen from FIG. 14, a large number of Edge/IoT processing devices may be communicating through the cloud 1400. This may allow different Edge/IoT processing devices to request or provide information to other devices autonomously. For example, a group of Edge/IoT processing devices (e.g., the traffic control group 1406) may request a current weather forecast from a group of remote weather stations 1414, which may provide the forecast without human intervention. Further, an emergency vehicle 1424 may be alerted by an automated teller machine 1420 that a burglary is in progress. As the emergency vehicle 1424 proceeds towards the automated teller machine 1420, it may access the traffic control group 1406 to request clearance to the location, for example, by lights turning red to block cross traffic at an intersection insufficient time for the emergency vehicle 1424 to have unimpeded access to the intersection.

Clusters of Edge/IoT processing devices, such as the remote weather stations 1414 or the traffic control group 1406, may be equipped to communicate with other Edge/IoT processing devices as well as with the cloud 1400. This may allow the Edge/IoT processing devices to form an ad-hoc network between the devices, allowing them to function as a single device, which may be termed a fog platform or system (e.g., as described above with reference to FIG. 11).

Figure 15:
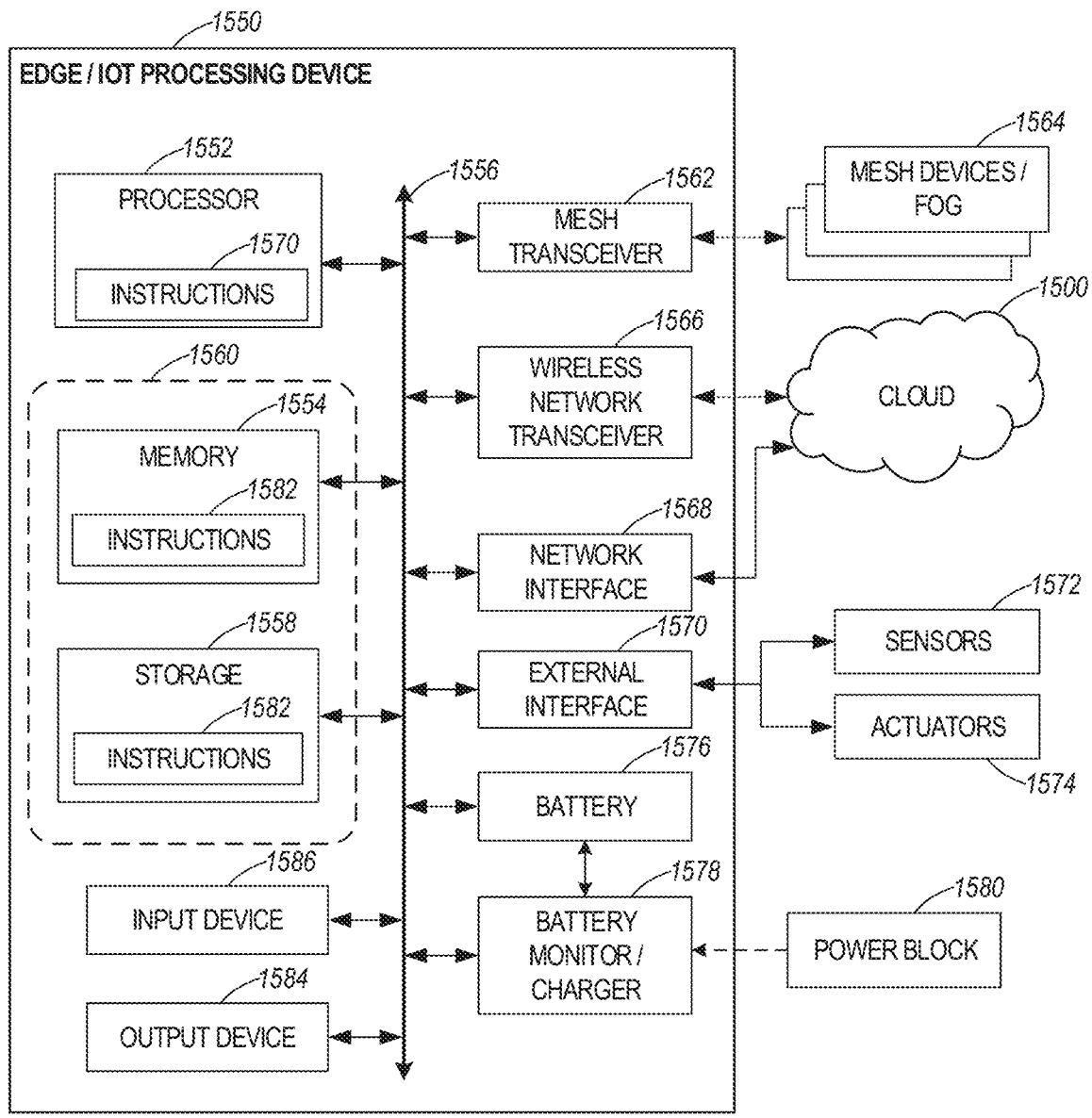
FIG. 15 is a block diagram of an example of components that may be present in an Edge/IoT processing device 1350 for implementing the techniques (e.g., operations, processes, methods, and methodologies) described herein, according to an example.

FIG. 15 is a block diagram of an example of components that may be present in an Edge/IoT processing device 1550 for implementing the techniques (e.g., operations, processes, methods, and methodologies) described herein. The Edge/IoT processing device 1550 may include any combinations of the components shown in the example or referenced in the disclosure above, and it may include any device usable with an Edge/Fog/IoT communication network or a combination of such networks. The components may be implemented as ICs, portions thereof, discrete electronic devices, or other modules, logic, hardware, software, firmware, or a combination thereof adapted in the Edge/IoT processing device 1550, or as components otherwise incorporated within a chassis of a larger system. Additionally, the block diagram of FIG. 15 is intended to depict a high-level view of components of the Edge/IoT processing device 1550. However, some of the components shown may be omitted, additional components may be present, and a different arrangement of the components shown may occur in other implementations.

The Edge/IoT processing device 1550 may include processing circuitry in the form of a processor 1552, which may be a microprocessor, a multi-core processor, a multithreaded processor, a field-programmable gate array (FPGA), an ultra-low voltage processor, an embedded processor, or other known processing elements. The processor 1552 may be a part of a system on a chip (SoC) in which the processor 1552 and other components are formed into a single integrated circuit, or a single package, such as the Edison™ or Galileo™ SoC boards from Intel. As an example, the processor 1552 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or a customer thereof, or their licensees or adopters. The processors may include units such as an A5-A12 processor from Apple® Inc., a Snapdragon™ processor from Qualcomm® Technologies, Inc., or an OMAP™ processor from Texas Instruments, Inc.

The processor 1552 may communicate with a system memory 1554 over an interconnect 1556 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1558 may also couple to the processor 1552 via the interconnect 1556. In an example, the storage 1558 may be implemented via a solid-state disk drive (SSDD). Other devices that may be used for the storage 1558 include flash memory cards, such as SD cards, microSD cards, Intel® Optane™ memory, XD picture cards, and the like, and USB flash drives. In low power implementations, the storage 1558 may be on-die memory or registers associated with the processor 1552. However, in some examples, the storage 1558 may be implemented using a micro hard disk drive (HDD). Further, any number of new technologies may be used for the storage 1558 in addition to, or instead of, the technologies described, such resistance change memories, phase change memories, holographic memories, or chemical memories, among others.

The components may communicate over the interconnect 1556. The interconnect 1556 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1556 may be a proprietary bus, for example, used in a SoC based system. Other bus systems may be included, such as an I2C interface, an SPI interface, point to point interfaces, and a power bus, among others.

The interconnect 1556 may couple the processor 1552 to a mesh transceiver 1562, for communications with other mesh devices 1564. The mesh transceiver 1562 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1564. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1562 may communicate using multiple standards or radios for communications at a different range. For example, the Edge/IoT processing device 1550 may communicate with close devices, e.g., within about 10 meters, using a local transceiver based on BLE, or another low power radio, to save power. More distant mesh devices 1564, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 1566 may be included to communicate with devices or services in the cloud 1500 via local or wide area network protocols. The wireless network transceiver 1566 may be an LPWA transceiver that follows the IEEE 802.15.4, or IEEE 802.15.4g standards, among others. The Edge/IoT processing device 1550 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1562 and wireless network transceiver 1566, as described herein. For example, the radio transceivers 1562 and 1566 may include an LTE or another cellular transceiver that uses spread spectrum (SPA/SAS) communications for implementing high-speed communications. Further, any number of other protocols may be used, such as Wi-Fi® networks for medium speed communications and provision of network communications.

The radio transceivers 1562 and 1566 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1566, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1568 may be included to provide a wired communication to the cloud 1500 or to other devices, such as the mesh devices 1564. The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1568 may be included to enable connecting to a second network, for example, a NIC 1568 providing communications to the cloud over Ethernet, and a second NIC 1568 providing communications to other devices over another type of network.

Given the variety of types of applicable communications from the device to another component or network, applicable communications circuitry used by the device may include or be embodied by any one or more of components 1562, 1566, 1568, or 1570. Accordingly, in various examples, applicable means for communicating (e.g., receiving, transmitting, etc.) may be embodied by such communications circuitry.

The interconnect 1556 may couple the processor 1552 to an external interface 1570 that is used to connect external devices or subsystems. The external devices may include sensors 1572, such as accelerometers, level sensors, flow sensors, optical light sensors, camera sensors, temperature sensors, a global positioning system (GPS) sensors, pressure sensors, barometric pressure sensors, and the like. The external interface 1570 further may be used to connect the Edge/IoT processing device 1550 to actuators 1574, such as power switches, valve actuators, an audible sound generator, a visual warning device, and the like.

In some optional examples, various input/output (I/O) devices may be present within or connected to, the Edge/IoT processing device 1550. For example, a display or other output device 1584 may be included to show information, such as sensor readings or actuator position. An input device 1586, such as a touch screen or keypad may be included to accept input. An output device 1584 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the Edge/IoT processing device 1550.

A battery 1576 may power the Edge/IoT processing device 1550, although, in examples in which the Edge/IoT processing device 1550 is mounted in a fixed location, it may have a power supply coupled to an electrical grid. The battery 1576 may be a lithium ion battery, or a metal-air battery, such as a zinc-air battery, an aluminum-air battery, a lithium-air battery, and the like.

A battery monitor/charger 1578 may be included in the Edge/IoT processing device 1550 to track the state of charge (SoCh) of the battery 1576. The battery monitor/charger 1578 may be used to monitor other parameters of the battery 1576 to provide failure predictions, such as the state of health (SoH) and the state of function (SoF) of the battery 1576. The battery monitor/charger 1578 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex.

The battery monitor/charger 1578 may communicate the information on the battery 1576 to the processor 1552 over the interconnect 1556. The battery monitor/charger 1578 may also include an analog-to-digital (ADC) converter that enables the processor 1552 to directly monitor the voltage of the battery 1576 or the current flow from the battery 1576. The battery parameters may be used to determine actions that the Edge/IoT processing device 1550 may perform, such as transmission frequency, mesh network operation, sensing frequency, and the like.

A power block 1580, or other power supply coupled to a grid, may be coupled with the battery monitor/charger 1578 to charge the battery 1576. In some examples, the power block 1580 may be replaced with a wireless power receiver to obtain the power wirelessly, for example, through a loop antenna in the Edge/IoT processing device 1550. A wireless battery charging circuit, such as an LTC4020 chip from Linear Technologies of Milpitas, Calif., among others, may be included in the battery monitor/charger 1578. The specific charging circuits may be selected based on the size of the battery 1576, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1558 may include instructions 1582 in the form of software, firmware, or hardware commands to implement the techniques described herein. Although such instructions 1582 are shown as code blocks included in the memory 1554 and the storage 1558, it may be understood that any of the code blocks may be replaced with hardwired circuits, for example, built into an application specific integrated circuit (ASIC) or into an FPGA.

In an example, the instructions 1582 provided via the memory 1554, the storage 1558, or the processor 1552 may be embodied as a non-transitory, machine-readable medium 1560 including code to direct the processor 1552 to perform electronic operations in the Edge/IoT processing device 1550. The processor 1552 may access the non-transitory, machine-readable medium 1560 over the interconnect 1556. For instance, the non-transitory, machine-readable medium 1560 may be embodied by devices described for the storage 1558 or may include specific storage units such as optical disks, flash drives, or any number of other hardware devices. The non-transitory, machine-readable medium 1560 may include instructions to direct the processor 1552 to perform a specific sequence or flow of actions, for example, as described with respect to the flowchart(s) and block diagram(s) of operations and functionality depicted above. As used in, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own or may be combined in any permutation or combination with any one or more of the other examples provided below or throughout the present disclosure.

Example 1 is a device of a service coordinating entity, comprising: communications circuitry to communicate with a first access network of a plurality of access networks; processing circuitry; and a memory device including instructions embodied thereon, where the instructions, which when executed by the processing circuitry, configure the processing circuitry to perform operations to: in response to a request for establishing a connection with a user equipment (UE) in a second access network of the plurality of access networks, retrieve a first Trusted Level Agreement (TLA) including a plurality of trust attributes associated with the first access network; perform one or more exchanges of the trust attributes of the first TLA and trust attributes of a second TLA associated with the second access network using a computing service executing on the service coordinating entity; generate a common TLA with trust attributes associated with communications between the first and second access networks based on the one or more exchanges; and route data traffic from the first access network to the UE in the second access network based on the trust attributes of the common TLA.

In Example 2, the subject matter of Example 1 includes, subject matter where the request for establishing the connection is received via a network function virtualization (NFV) instance from a UE in the first access network.

In Example 3, the subject matter of Example 2 includes, subject matter where the plurality of trust attributes for the first TLA include secure credentials associated with one or more of the following: operating environments of the NFV instance, the mobile service, and the UE in the first access network.

In Example 4, the subject matter of Example 3 includes, subject matter where the processing circuitry is further configured to: retrieve the secure credentials associated with the UE in the first access network from the memory device, where the secure credentials associated with the UE are stored as encapsulated objects.

In Example 5, the subject matter of Examples 2-4 includes, subject matter where the trust attributes of the common TLA include secure credentials that are common to operating environments in the first access network and the second access network.

In Example 6, the subject matter of Examples 1-5 includes, subject matter where the NFV instance is a Multi-Access Edge Computing (MEC) application executing on a virtualization infrastructure of the service coordinating entity.

In Example 7, the subject matter of Examples 1-6 includes, subject matter where the service coordinating entity is a Multi-Access Edge Computing (MEC) host executing the NFV instance as a MEC application instantiated on a virtualization infrastructure of the service coordinating entity.

In Example 8, the subject matter of Example 7 includes, subject matter where the MEC host is configured to operate according to a standard from a European Telecommunications Standards Institute (ETSI) MEC standards family.

In Example 9, the subject matter of Examples 1-8 includes, subject matter where to perform the one or more exchanges of the trust attributes, the processing circuitry is further configured to: receive the trust attributes of the second TLA from a second computing service executing on a second service coordinating entity in the second access network.

In Example 10, the subject matter of Example 9 includes, subject matter where the computing service and the second computing service are Multi-Access Edge Computing (MEC) services coupled via an Mp3 interface.

In Example 11, the subject matter of Examples 1-10 includes, subject matter where the first access network is a first public land mobile network (PLMN) of a first service provider, and the second access network is a second PLMN of a second service provider.

In Example 12, the subject matter of Examples 1-11 includes, subject matter where the plurality of access networks are wireless networks operating according to a 3GPP standards family.

In Example 13, the subject matter of Examples 1-12 includes, subject matter where the processing circuitry is further configured to: store the common TLA in a distributed ledger shared between the first access network and the second access network.

In Example 14, the subject matter of Examples 2-13 includes, subject matter where the processing circuitry is further configured to: detect the UE is roaming from the first access network into the second access network; and perform the one or more exchanges of the trust attributes of the first TLA and trust attributes of a second TLA associated with the second access network in response to the detecting.

In Example 15, the subject matter of Example 14 includes, subject matter where the processing circuitry is further configured to: route the data traffic from the computing service executing on the service coordinating entity to a Multi-Access Edge Computing (MEC) application instantiated within a virtualization infrastructure of a second service coordinating entity, the MEC application instantiated with the trust attributes of the common TLA.

In Example 16, the subject matter of Example 15 includes, subject matter where the UE roaming in the second access network receives the routed data traffic via the MEC application instantiated within the virtualization infrastructure of the second service coordinating entity.

Example 17 is at least one machine-readable storage medium including instructions, where the instructions, when executed by a processing circuitry of a service coordinating entity in a first access network of a plurality of access networks, cause the processing circuitry to perform operations comprising: in response to a request for establishing a connection with a user equipment (UE) in a second access network of the plurality of access networks, retrieving a first Trusted Level Agreement (TLA) including a plurality of trust attributes associated with the first access network; performing one or more exchanges of the trust attributes of the first TLA and trust attributes of a second TLA associated with the second access network using a computing service executing on the service coordinating entity; generating a common TLA with trust attributes associated with communications between the first and second access networks based on the one or more exchanges; and routing data traffic from the first access network to the UE in the second access network based on the trust attributes of the common TLA.

In Example 18, the subject matter of Example 17 includes, subject matter where the service coordinating entity is a Multi-Access Edge Computing (MEC) host executing the NFV instance as a MEC application instantiated on a virtualization infrastructure of the service coordinating entity.

In Example 19, the subject matter of Example 18 includes, subject matter where the MEC host is configured to operate according to a standard from a European Telecommunications Standards Institute (ETSI) MEC standards family.

In Example 20, the subject matter of Examples 17-19 includes, subject matter where to perform the one or more exchanges of the trust attributes, the instructions further cause the processing circuitry to perform operations comprising: receiving the trust attributes of the second TLA from a second computing service executing on a second service coordinating entity in the second access network.

In Example 21, the subject matter of Example 20 includes, subject matter where the computing service and the second computing service are Multi-Access Edge Computing (MEC) services coupled via an Mp3 interface.

In Example 22, the subject matter of Examples 17-21 includes, subject matter where the first access network is a first public land mobile network (PLMN) of a first service provider, and the second access network is a second PLMN of a second service provider.

In Example 23, the subject matter of Examples 17-22 includes, subject matter where the plurality of access networks are wireless networks operating according to a 3GPP standards family.

In Example 24, the subject matter of Examples 17-23 includes, subject matter where the instructions further cause the processing circuitry to perform operations comprising: storing the common TLA in a distributed ledger shared between the first access network and the second access network.

In Example 25, the subject matter of Examples 17-24 includes, subject matter where the request for establishing the connection is received via a network function virtualization (NFV) instance from a UE in the first access network.

In Example 26, the subject matter of Example 25 includes, subject matter where the plurality of trust attributes for the first TLA include secure credentials associated with one or more of the following: operating environments of the NFV instance, the mobile service, and the UE in the first access network.

In Example 27, the subject matter of Example 26 includes, subject matter where the instructions further cause the processing circuitry to perform operations comprising: retrieving the secure credentials associated with the UE in the first access network from the memory device, where the secure credentials associated with the UE are stored as encapsulated objects.

In Example 28, the subject matter of Examples 25-27 includes, subject matter where the trust attributes of the common TLA include secure credentials that are common to operating environments in the first access network and the second access network.

In Example 29, the subject matter of Examples 17-28 includes, subject matter where the NFV instance is a Multi-Access Edge Computing (MEC) application executing on a virtualization infrastructure of the service coordinating entity.

In Example 30, the subject matter of Examples 25-29 includes, subject matter where the instructions further cause the processing circuitry to perform operations comprising: detecting the UE is roaming from the first access network into the second access network; and performing the one or more exchanges of the trust attributes of the first TLA and trust attributes of a second TLA associated with the second access network in response to the detecting.

In Example 31, the subject matter of Example 30 includes, subject matter where the instructions further cause the processing circuitry to perform operations comprising: routing the data traffic from the computing service executing on the service coordinating entity to a Multi-Access Edge Computing (MEC) application instantiated within a virtualization infrastructure of a second service coordinating entity, the MEC application instantiated with the trust attributes of the common TLA.

In Example 32, the subject matter of Example 31 includes, subject matter where the UE roaming in the second access network receives the routed data traffic via the MEC application instantiated within the virtualization infrastructure of the second service coordinating entity.

Example 33 is a system, comprising: a user equipment (UE) device, comprising communications circuitry to communicate via a first access network of a plurality of access networks, and processing circuitry configured to: encode for transmission to a network function virtualization (NFV) instance via the first access network, a request for establishing a connection with a second UE device in a second access network of the plurality of access networks; and a Multi-Access Edge Computing (MEC) entity, comprising communications circuitry to communicate via the first access network, and processing circuitry configured to: decode the request for establishing the connection with the second UE device, the request received via the NFV instance instantiated on a virtualization infrastructure of the MEC entity; in response to the request, retrieve a first Trusted Level Agreement (TLA) including a plurality of trust attributes associated with the first access network; perform one or more exchanges of the trust attributes of the first TLA and trust attributes of a second TLA associated with the second access network using a computing service executing on the MEC entity; generate a common TLA with trust attributes associated with communications between the first and second access networks based on the one or more exchanges; and route data traffic originating from the UE device to the second UE device in the second access network based on the trust attributes of the common TLA.

In Example 34, the subject matter of Example 33 includes, subject matter where the trust attributes of the common TLA comprise one or more of the following: domain identifiers of the first and second access networks; resource identifiers for one or more trusted software or hardware resources used for communicating between the first and second access networks; an operational level agreement (OLA) or a service level agreement (SLA) associated with the common TLA; and validity data range for the common TLA.

In Example 35, the subject matter of Examples 33-34 includes, subject matter where the plurality of trust attributes for the first TLA include secure credentials associated with one or more of the following: operating environments of the NFV instance, the mobile service, and the UE in the first access network.

In Example 36, the subject matter of Examples 33-35 includes, subject matter where the NFV instance is a MEC application executing on a virtualization infrastructure of the MEC entity.

In Example 37, the subject matter of Examples 33-36 includes, subject matter where the MEC entity is a MEC host executing the NFV instance as a MEC application.

In Example 38, the subject matter of Examples 33-37 includes, subject matter where to perform the one or more exchanges of the trust attributes, the processing circuitry of the MEC entity is further configured to: receive the trust attributes of the second TLA from a second computing service executing on a second MEC entity in the second access network.

In Example 39, the subject matter of Example 38 includes, subject matter where the computing service and the second computing service are MEC services coupled via an Mp3 interface.

In Example 40, the subject matter of Examples 33-39 includes, subject matter where the first access network is a first public land mobile network (PLMN) of a first service provider, and the second access network is a second PLMN of a second service provider.

In Example 41, the subject matter of Examples 33-40 includes, subject matter where the plurality of access networks are wireless networks operating according to a 3GPP standards family.

In Example 42, the subject matter of Examples 33-41 includes, subject matter where the processing circuitry of the MEC entity is further configured to: store the common TLA in a distributed ledger shared between the first access network and the second access network.

In Example 43, the subject matter of Examples 33-42 includes, subject matter where the processing circuitry of the MEC entity is further configured to: detect the UE is roaming from the first access network into the second access network; and perform the one or more exchanges of the trust attributes of the first TLA and trust attributes of a second TLA associated with the second access network in response to the detecting.

In Example 44, the subject matter of Example 43 includes, subject matter where the processing circuitry of the MEC entity is further configured to: route the data traffic from the computing service executing on the service coordinating entity to a MEC application instantiated within a virtualization infrastructure of a second MEC entity, the MEC application instantiated with the trust attributes of the common TLA.

In Example 45, the subject matter of Example 44 includes, subject matter where the UE roaming in the second access network receives the routed data traffic via the MEC application instantiated within the virtualization infrastructure of the second MEC entity.

Example 46 is a system, comprising: a first Multi-Access Edge Computing (MEC) entity, comprising communications circuitry to communicate via a first access network of a plurality of access networks, and processing circuitry configured to: decode a request from a user equipment (UE) device in the first access network for establishing a connection with a second UE device, the request received via a network function virtualization (NFV) instance instantiated on a virtualization infrastructure of the MEC entity; in response to the request, retrieve a first Trusted Level Agreement (TLA) including a plurality of trust attributes associated with the first access network; and route data traffic originating from the UE device to the second UE device in the second access network based on trust attributes of a common TLA associated with the first and second access network, the common TLA generated based on the first TLA; and a second MEC entity, comprising communications circuitry to communicate via the first access network, and processing circuitry configured to: perform one or more exchanges of the trust attributes of the first TLA and trust attributes of a second TLA associated with a third MEC entity within the second access network; and generate the common TLA with trust attributes associated with communications between the first and second access networks based on the one or more exchanges.

In Example 47, the subject matter of Example 46 includes, subject matter where the first MEC entity is a MEC host, and the second and third MEC entities are MEC orchestrators.

In Example 48, the subject matter of Examples 46-47 includes, subject matter where the processing circuitry of the second MEC entity is to: perform the one or more exchanges of the trust attributes via an interface between the second and third MEC entities.

Example 49 is a device of a Multi-Access Edge Computing (MEC) orchestrator, comprising: communications circuitry to communicate with a first access network of a plurality of access networks; processing circuitry; and a memory device including instructions embodied thereon, where the instructions, which when executed by the processing circuitry, configure the processing circuitry to perform operations to: in response to a request for establishing a connection with a user equipment (UE) in a second access network of the plurality of access networks, retrieve a first Trusted Level Agreement (TLA) including a plurality of trust attributes associated with the first access network; perform one or more exchanges of the trust attributes of the first TLA and trust attributes of a second TLA associated with a second MEC orchestrator in a second access network of the plurality of access networks; generate a common TLA with trust attributes associated with communications between the first and second access networks based on the one or more exchanges; and route the common TLA to a service coordinating entity in the first access network for establishing a trusted communication link between the service coordinating entity and a second service coordinating entity in the second access network.

In Example 50, the subject matter of Example 49 includes, subject matter where the processing circuitry of the MEC orchestrator is to: perform the one or more exchanges of the trust attributes via an interface between the MEC orchestrator and the second MEC orchestrator.

Example 51 is at least one machine-readable medium including instructions that, when executed by processing circuitry, cause the processing circuitry to perform operations to implement of any of Examples 1-50.

Example 52 is an apparatus comprising means to implement of any of Examples 1-50.

Example 53 is a system to implement of any of Examples 1-50.

Example 54 is a method to implement of any of Examples 1-50.

Example 55 may include an apparatus comprising means to perform one or more elements of a method described in or related to any of examples 1-50, or any other method or process described herein.

Example 56 may include one or more non-transitory computer-readable media comprising instructions to cause an electronic device, upon execution of the instructions by one or more processors of the electronic device, to perform one or more elements of a method described in or related to any of examples 1-50, or any other method or process described herein.

Example 57 may include an apparatus comprising logic, modules, or circuitry to perform one or more elements of a method described in or related to any of examples 1-50, or any other method or process described herein.

Example 58 may include a method, technique, or process as described in or related to any of examples 1-50, or portions or parts thereof.

Example 59 may include an apparatus comprising: one or more processors and one or more computer readable media comprising instructions that, when executed by the one or more processors, cause the one or more processors to perform the method, techniques, or process as described in or related to any of examples 1-50, or portions thereof.

Example 60 may include a signal as described in or related to any of examples 1-50, or portions or parts thereof.

Example 61 may include a signal in a wireless network as described in or related to any of examples 1-50, or as otherwise shown and described herein.

Example 62 may include a method of communicating in a wireless network as described in or related to any of examples 1-50, or as otherwise shown and described herein.

Example 63 may include a system for providing wireless communication as described in or related to any of examples 1-50, or as otherwise shown and described herein.

Example 64 may include a device for providing wireless communication as described in or related to any of examples 1-50, or as otherwise shown and described herein.

Example 65 is a network comprising respective devices and device communication mediums for performing any of the operations of examples 1-50, or as otherwise shown and described herein.

Example 66 is an 4G/5G communications network topology, the network topology comprising respective communication links adapted to perform communications for the operations of any of examples 1-50, or as otherwise shown and described herein.

Example 67 is an edge cloud computing device implementation comprising processing nodes and computing units adapted for performing any of the operations of examples 1-50, or as otherwise shown and described herein.

Example 68 is an ETSI MEC system implementation comprising devices, processing nodes, and computing units adapted for performing any of the operations of examples 1-50, or as otherwise shown and described herein.

Example 69 is a MEC system implementation, including respective MEC entities including MEC hosts, MEC platforms, orchestrator, adapted for performing any of the operations of examples 1-50, or as otherwise shown and described herein.

Example 70 is an edge cloud network platform comprising physical and logical computing resources adapted for performing any of the operations of examples 1-50, or as otherwise shown and described herein.

Example 71 is an apparatus comprising respective means for performing any of the operations of examples 1-50, or as otherwise shown and described herein.

Example 72 is a system to perform the operations of any of examples 1-50, or as otherwise shown and described herein.

Example 73 is at least one machine-readable storage medium, comprising information representative of instructions that, when executed by processing circuitry, cause the processing circuitry to, perform the operations of any of examples 1-50.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus the following claims are hereby incorporated into the Detailed Description, with each claim standing on its own as a separate aspect.

What is claimed is:

1. A device of a service coordinating entity, comprising: communications circuitry to communicate with a first access network of a plurality of access networks;
processing circuitry; and
a memory device including instructions embodied thereon, wherein the instructions, which when executed by the processing circuitry, configure the processing circuitry to perform operations to:
detect a user equipment (UE) is roaming from a second access network of the plurality of access networks into the first access network, the UE accessing a computing service of the second access network;

generate a first plurality of trust attributes that are common to network entities within the first access network and the second access network based on at least one trust attribute exchange between the first and second access networks, in response to detecting the UE is roaming into the first access network;

instantiate, using a subset of the first plurality of trust attributes, a first application within a virtualization infrastructure of the first access network, the first application using the computing service, the subset being common to trust attributes associated with establishing a second application, the second application providing access to the computing service within the second access network; and while the UE is roaming in the first access network, route data traffic between the UE and the computing service of the second access network via the first application, wherein the service coordinating entity is a Multi-Access Edge Computing (MEC) host executing the first application as a MEC application instantiated on a virtualization infrastructure of the MEC host.

2. The device of claim 1, wherein the processing circuitry is further configured to:

initialize the first application within the virtualization infrastructure of the first access network using a second plurality of trust attributes applicable to a subset of the network entities within the first access network; and establish a communication link between the first application and the computing service of the second access network.

3. The device of claim 2, wherein the processing circuitry is further configured to:

retrieve at least a portion of the second plurality of trust attributes from a credential cache associated with the UE, the credential cache stored as an encapsulated object within the first access network.

4. The device of claim 2, wherein the processing circuitry is further configured to:

re-establish the communication link between the first application and the computing service using the first plurality of trust attributes.

5. The device of claim 1, wherein the processing circuitry is further configured to:

perform a communication exchange of trust attributes for the first access network and trust attributes for the second access network; and generate, based on the communication exchange, the first plurality of trust attributes applicable to the network entities within the first access network and the second access network.

6. The device of claim 5, wherein the trust attributes for the first access network include secure credentials or measurements associated with one or more of the following: an operating environment of the first application, a mobile service of the first access network, and the UE in the first access network.

7. The device of claim 1, wherein the first plurality of trust attributes includes secure credentials that are common to operating environments in the first access network and the second access network.

8. The device of claim 1, wherein the first application is a Multi-Access Edge Computing (MEC) application executing on a virtualization infrastructure of the service coordinating entity.

9. The device of claim 1, wherein the processing circuitry is further configured to:

retrieve trust attributes associated with usage of the computing service by network entities of the second access network;

generate a second plurality of trust attributes that are common to usage of the computing service by network entities within the first access network and the second access network, based on the trust attributes associated with usage of the computing service by network entities of the second access network; and instantiate a network function virtualization (NFV) instance of the computing service within the first access network based on the second plurality of trust attributes.

10. At least one non-transitory machine-readable storage medium including instructions, wherein the instructions, when executed by a processing circuitry of a service coordinating entity in a first access network of a plurality of access networks, cause the processing circuitry to perform operations comprising:

detecting a user equipment (UE) is roaming from a second access network of the plurality of access networks into the first access network, the UE accessing a computing service of the second access network;

generating a first plurality of trust attributes that are common to network entities within the first access network and the second access network based on at least one trust attribute exchange between the first and second access networks, in response to detecting the UE is roaming into the first access network;

instantiating, using a subset of the first plurality of trust attributes, a first application within a virtualization infrastructure of the first access network, the first application using the computing service, the subset being common to trust attributes associated with establishing a second application, the second application providing access to the computing service within the second access network; and while the UE is roaming in the first access network, routing data traffic between the UE and the computing service of the second access network via the first application, wherein the service coordinating entity is a Multi-Access Edge Computing (MEC) host executing the first application as a MEC application instantiated on a virtualization infrastructure of the MEC host.

11. The at least one non-transitory machine-readable storage medium of claim 10, wherein the instructions further cause the processing circuitry to perform operations comprising:

initializing the first application within the virtualization infrastructure of the first access network using a second plurality of trust attributes applicable to a subset of the network entities within the first access network; and establishing a communication link between the first application and the computing service of the second access network.

12. The at least one non-transitory machine-readable storage medium of claim 11, wherein the instructions further cause the processing circuitry to perform operations comprising:

retrieving at least a portion of the second plurality of trust attributes from a credential cache associated with the UE, the credential cache stored as an encapsulated object within the first access network.

13. The at least one non-transitory machine-readable storage medium of claim 11, wherein the instructions further cause the processing circuitry to perform operations comprising:

re-establishing the communication link between the first application and the computing service using the first plurality of trust attributes.

14. The at least one non-transitory machine-readable storage medium of claim 10, wherein the instructions further cause the processing circuitry to perform operations comprising:
performing a communication exchange of trust attributes for the first access network and trust attributes for the second access network; and
generating, based on the communication exchange, the first plurality of trust attributes applicable to the network entities within the first access network and the second access network.

15. The at least one non-transitory machine-readable storage medium of claim 14, wherein the trust attributes for the first access network include secure credentials or measurements associated with one or more of the following: an operating environment of the first application, a mobile service of the first access network, and the UE in the first access network.

16. The at least one non-transitory machine-readable storage medium of claim 10, wherein the first plurality of trust attributes includes secure credentials that are common to operating environments in the first access network and the second access network, and wherein the first application is a Multi-Access Edge Computing (MEC) application executing on a virtualization infrastructure of the service coordinating entity.

17. A service coordinating apparatus in a first access network of a plurality of access networks, the apparatus comprising:
means for detecting a user equipment (UE) is roaming from a second access network of the plurality of access networks into the first access network, the UE accessing a computing service of the second access network;
means for generating a first plurality of trust attributes that are common to network entities within the first access network and the second access network based on at least one trust attribute exchange between the first and second access networks, in response to detecting the UE is roaming into the first access network;
means for instantiating, using a subset of the first plurality of trust attributes, a first application within a virtualization infrastructure of the first access network, the first application using the computing service, the subset being common to trust attributes associated with establishing a second application, the second application providing access to the computing service within the second access network; and
means for routing data traffic between the UE and the computing service of the second access network via the first application, while the UE is roaming in the first access network, wherein the service coordinating apparatus is a Multi-Access Edge Computing (MEC) host executing the first application as a MEC application instantiated on a virtualization infrastructure of the MEC host.

18. The apparatus of claim 17, further comprising:
means for performing a communication exchange of trust attributes for the first access network and trust attributes for the second access network; and
means for generating, based on the communication exchange, the first plurality of trust attributes applicable to the network entities within the first access network and the second access network.

19. The apparatus of claim 17, further comprising:
means for retrieving trust attributes associated with usage of the computing service by network entities of the second access network;
means for generating a second plurality of trust attributes that are common to usage of the computing service by network entities within the first access network and the second access network, based on the trust attributes associated with usage of the computing service by network entities of the second access network; and
means for instantiating a network function virtualization (NFV) instance of the computing service within the first access network based on the second plurality of trust attributes.

* * * * *

UNITED STATES PATENT AND TRADEMARK OFFICE
CERTIFICATE OF CORRECTION

| | | |
|---|---|---|
| PATENT NO. | : 11,736,942 B2 | Page 1 of 1 |
| APPLICATION NO. | : 17/076452 | |
| DATED | : August 22, 2023 | |
| INVENTOR(S) | : Bachmutsky et al. | |

It is certified that error appears in the above-identified patent and that said Letters Patent is hereby corrected as shown below:

On the Title Page

On page 2, in Column 2, Item (56) under "Other Publications", Line 32, delete "Secutiry" and insert --Security-- therefor Signed and Sealed this
Third Day of December, 2024

Katherine Kelly Vidal
*Director of the United States Patent and Trademark Office*